(12) United States Patent
Ikefuji et al.

(10) Patent No.: US 10,778,046 B2
(45) Date of Patent: Sep. 15, 2020

(54) POWER TRANSMITTING DEVICE AND NON-CONTACT POWER FEEDING SYSTEM

(71) Applicant: Rohm Co., Ltd., Kyoto (JP)

(72) Inventors: Yoshihiro Ikefuji, Kyoto (JP); Akihiro Okui, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 276 days.

(21) Appl. No.: 15/736,425

(22) PCT Filed: Jun. 8, 2016

(86) PCT No.: PCT/JP2016/067026
§ 371 (c)(1),
(2) Date: Dec. 14, 2017

(87) PCT Pub. No.: WO2016/208392
PCT Pub. Date: Dec. 29, 2016

(65) Prior Publication Data
US 2018/0183277 A1    Jun. 28, 2018

(30) Foreign Application Priority Data

Jun. 25, 2015 (JP) ................................. 2015-127769

(51) Int. Cl.
*H02J 50/60* (2016.01)
*H02J 50/12* (2016.01)
(Continued)

(52) U.S. Cl.
CPC .............. *H02J 50/60* (2016.02); *H02J 50/12* (2016.02); *H02J 50/80* (2016.02); *H04B 5/0037* (2013.01); *H04B 5/0081* (2013.01)

(58) Field of Classification Search
CPC . H02J 50/60; H02J 50/80; H02J 50/12; H04B 5/0081; H04B 5/0037
(Continued)

(56) References Cited

U.S. PATENT DOCUMENTS

| 2009/0133942 A1* | 5/2009 | Iisaka | H02J 7/025 178/43 |
| 2010/0225173 A1* | 9/2010 | Aoyama | H02J 5/005 307/104 |

(Continued)

FOREIGN PATENT DOCUMENTS

| EP | 2779359 A2 | 9/2014 |
| JP | 2013-013318 | 1/2013 |

(Continued)

OTHER PUBLICATIONS

Extended European Search Report issued in European Application No. 16814163.8 dated Dec. 20, 2018, 7 pages.

(Continued)

*Primary Examiner* — Rexford N Barnie
*Assistant Examiner* — Thai H Tran
(74) *Attorney, Agent, or Firm* — Fish & Richardson P.C.

(57) ABSTRACT

In this non-contact power feeding system that is capable of transmitting power from a power transmitting device (1) to a power receiving device (2) by a magnetic field resonance scheme, the power transmitting device (1) is provided with first to n-th resonant circuits (TT[1]-TT[n]) which are provided with coils ($T_L$) that are different in size, respectively, and which have a resonant frequency set to a prescribed reference frequency. Prior to power transmission, test magnetic fields are generated in sequence in the first to n-th resonant circuits to detect the amplitude of current flowing through the coils of respective resonant circuits, and the presence/absence of a foreign object is determined on the basis of the obtained first to n-th amplitude detected values, to control execution of the power transmission.

11 Claims, 19 Drawing Sheets

(51) Int. Cl.
*H02J 50/80* (2016.01)
*H04B 5/00* (2006.01)

(58) Field of Classification Search
USPC .......................................... 307/104; 320/108
See application file for complete search history.

(56) References Cited

U.S. PATENT DOCUMENTS

| | | | |
|---|---|---|---|
| 2012/0248891 A1 | 10/2012 | Drennen | |
| 2013/0015719 A1 | 1/2013 | Jung et al. | |
| 2013/0069441 A1 | 3/2013 | Verghese et al. | |
| 2013/0127255 A1* | 5/2013 | Tsujimoto | H04B 5/0037 307/104 |
| 2014/0035521 A1 | 2/2014 | Endo | |
| 2014/0103732 A1* | 4/2014 | Irie | H02J 50/80 307/104 |
| 2014/0266036 A1* | 9/2014 | Jung | G01R 29/0814 320/108 |
| 2015/0280453 A1 | 10/2015 | Ikefuji | |
| 2016/0013683 A1 | 1/2016 | Endo | |
| 2016/0276875 A1 | 9/2016 | Verghese et al. | |
| 2016/0282500 A1* | 9/2016 | Filippenko | G01V 3/104 |

FOREIGN PATENT DOCUMENTS

| | | |
|---|---|---|
| JP | 2013-026623 | 2/2013 |
| JP | 2014-033504 | 2/2014 |
| JP | 2014-514905 | 6/2014 |
| JP | 2014-526871 | 10/2014 |
| JP | 2015-202025 | 11/2015 |

OTHER PUBLICATIONS

Japan Patent Office for International Application No. PCT/JP2016/067026 (dated Aug. 9, 2016) (with English translation).

* cited by examiner

SEPARATE STATE

REFERENCE POSITION STATE

FIG.9
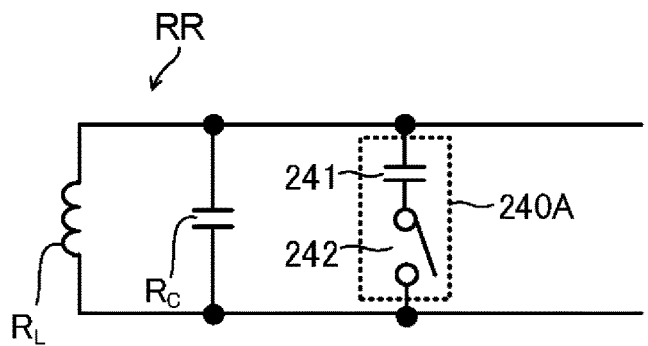
FIG.10
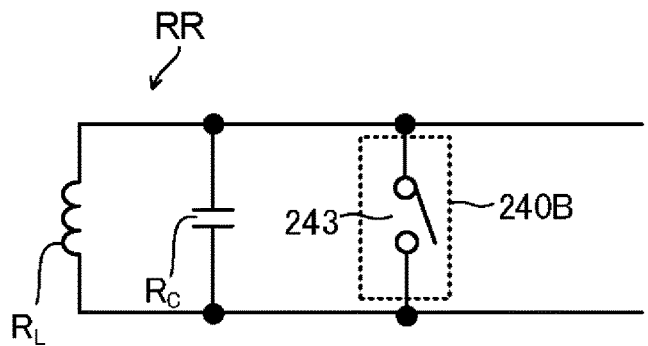
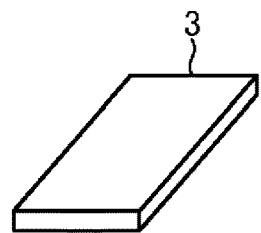
FIG.11A
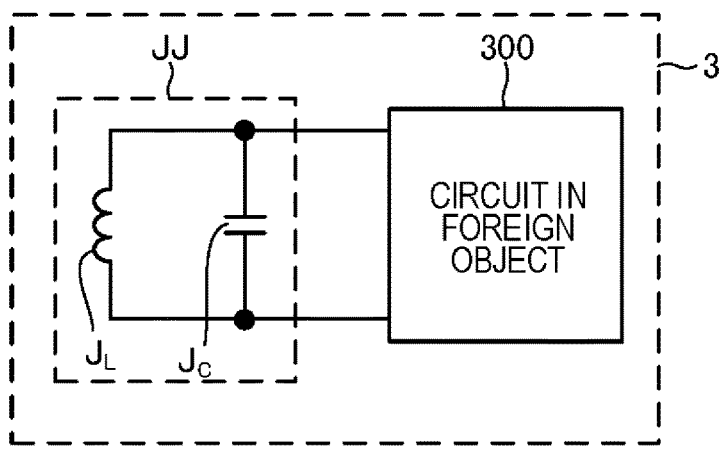
FIG.11B

FIG. 14
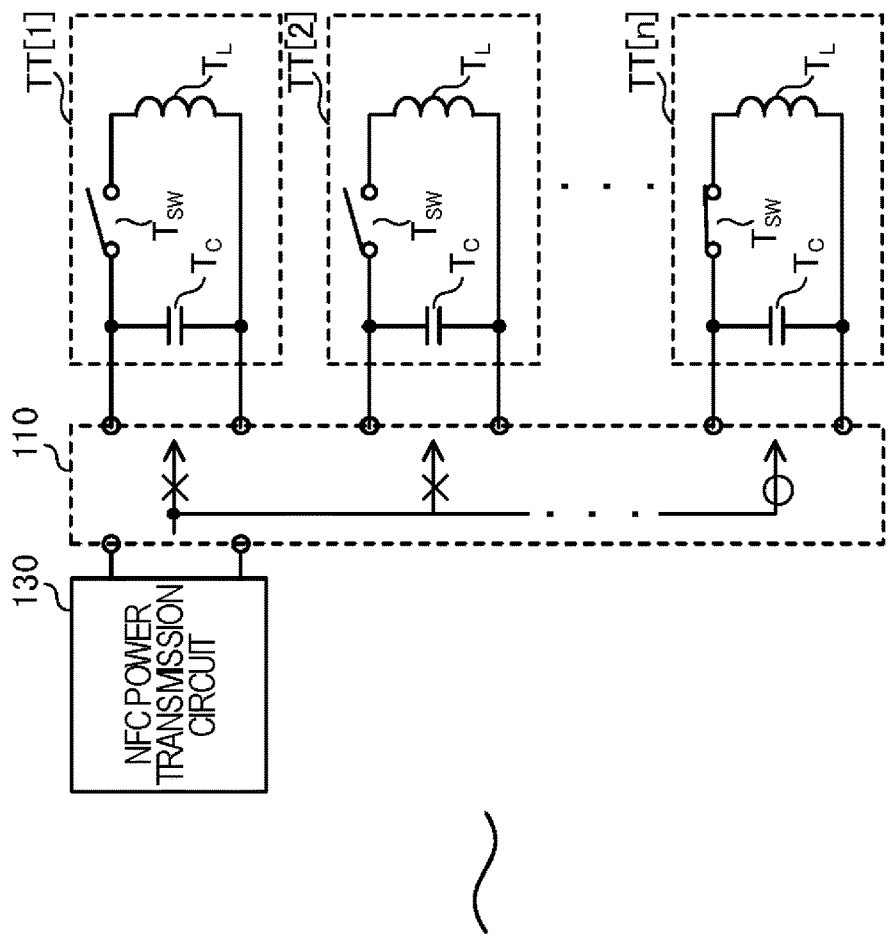
n-TH FOREIGN OBJECT DETECTING CONNECTION STATE
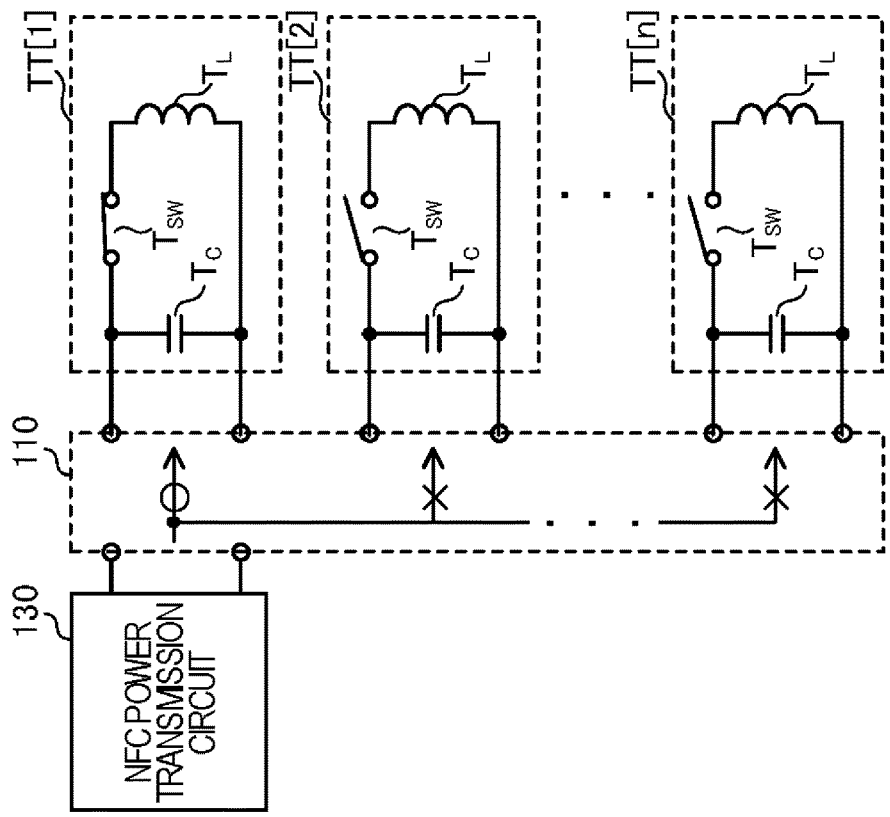
FIRST FOREIGN OBJECT DETECTING CONNECTION STATE

INITIAL SETTING PROCESS

FIRST CASE 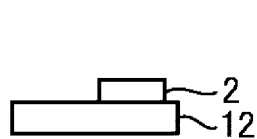
FIG.18A
SECOND CASE 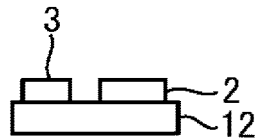
FIG.18B
THIRD CASE 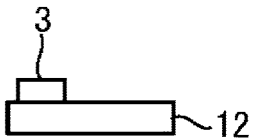
FIG.18C
FOURTH CASE 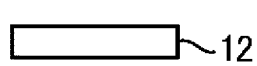
FIG.18D
FIG.19
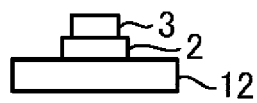

POWER TRANSMITTING DEVICE AND NON-CONTACT POWER FEEDING SYSTEM

TECHNICAL FIELD

The present invention relates to a power transmitting device and a non-contact power feeding system.

BACKGROUND ART

As one type of proximity wireless communication, there is wireless communication with near field communication (NFC) using a carrier frequency at 13.56 MHz. On the other hand, there is also proposed a technique of utilizing a coil used in the NFC communication so as to perform non-contact power feeding by a magnetic field resonance scheme.

In the non-contact power feeding using magnetic field resonance, a power transmission resonant circuit including a power transmission coil is disposed in a power feeding device, while a power reception resonant circuit including a power reception coil is disposed in an electronic device as a power receiving device, and resonant frequencies of the resonant circuits of them are set to the same reference frequency. Then, alternating current is made to flow in the power transmission coil so that alternating magnetic field having the reference frequency is generated in the power transmission coil. Then, this alternating magnetic field propagates to the power reception resonant circuit resonating at the reference frequency, and hence alternating current flows in the power reception coil. In other words, power is transmitted from the power transmission resonant circuit including the power transmission coil to the power reception resonant circuit including the power reception coil.

LIST OF CITATIONS

Patent Literature

Patent Document 1: JP-A-2014-33504

SUMMARY OF THE INVENTION

Technical Problem

Usually, only an electronic device corresponding to the power feeding device is placed on a power feeding table (power feeding mat or a power feeding cradle) of the power feeding device so that desired power feeding (power transfer) is performed. However, a foreign object that does not correspond to the power feeding device may be misplaced on the power feeding table. The foreign object is, for example, an object (such as a card) having a wireless IC tag with an antenna coil of 13.56 MHz, which does not respond to the NFC communication. Further, for example, the foreign object is an electronic device that has the NFC communication function though it is disabled. For example, if a smartphone has the NFC communication function but the function is disabled by software setting, the smartphone can be the foreign object. In addition, if a smartphone has the NFC communication function that is enabled but does not have a power receiving function, the smartphone is classified as a foreign object.

In a state where such the foreign object is placed on the power feeding table, if the power feeding device performs a power transmission operation, the foreign object may be broken by a strong magnetic field generated by the power transmission coil. For example, the strong magnetic field in the power transmission operation may increase a terminal voltage of the coil in the foreign object on the power feeding table up to 100 V to 200 V, and the foreign object is broken if the foreign object is not made to withstand such high voltage.

In order to avoid breakage or the like of the foreign object, it is useful to detect presence or absence of a foreign object so as to control execution of the power transmission. In this case, it is important to consider various shapes (including sizes) of coils of foreign objects (this importance will be described later in detail). It is earnestly desired to propose a device and a system capable of effectively prevent breakage or the like of foreign objects in view of the above consideration.

Accordingly, it is an object the present invention to provide a power transmitting device and a non-contact power feeding system, which contribute to prevention of breakage or the like of foreign objects.

Means for Solving the Problem

A power transmitting device according to the present invention, which is capable of transmitting power to a power receiving device by a magnetic field resonance scheme, includes first to n-th resonant circuits (n is an integer equal to or larger than 2) having different sizes of coils and resonant frequencies set to a prescribed reference frequency, a power transmission circuit arranged to selectively supply an AC signal to one of the first to n-th resonant circuits, a detection circuit arranged to detect amplitude of current flowing in the coil of the resonant circuit supplied with the AC signal, and a control circuit arranged to control the power transmission circuit. The control circuit sequentially supplies the AC signal to the first to n-th resonant circuits so as to obtain first to n-th amplitude detected values corresponding to the first to n-th resonant circuits from the detection circuit prior to the power transmission, and performs execution control of the power transmission based on the first to n-th amplitude detected values.

Specifically, for example, in the power transmitting device described above, it is preferred that the control circuit should determine presence or absence of a foreign object that is different from the power receiving device and includes a resonant circuit having a resonant frequency set to the reference frequency, based on the first to n-th amplitude detected values, and should enable execution of the power transmission when determining that the foreign object does not exist, while it should disable the execution of the power transmission when determining that the foreign object exists.

Furthermore, for example, in the power transmitting device described above, the control circuit may determine whether to enable or disable the execution of the power transmission by comparing each of the first to n-th amplitude detected values with a predetermined reference value.

Alternatively, for example, in the power transmitting device described above, the control circuit may determine whether to enable or disable the execution of the power transmission by comparing a minimum value of the first to n-th amplitude detected values with a predetermined reference value.

Alternatively, for example, in the power transmitting device described above, it is preferred that the power transmission should be performed using the power transmission circuit and the first resonant circuit, and intensities of magnetic fields generated by the coils of the resonant circuits when the AC signal is supplied to the resonant circuits prior to the power transmission should be smaller than intensity of a magnetic field generated by the coil of the first resonant circuit when the power transmission is performed.

Furthermore, for example, it is preferred that the power receiving device should include a power reception resonant circuit having a resonant frequency set to the reference frequency so as to be capable of receiving power with the power reception resonant circuit, and when the first to n-th amplitude detected values are obtained, the resonant frequency of the power reception resonant circuit should be changed from the reference frequency, or the coil of the power reception resonant circuit should be short-circuited in the power receiving device, according to a signal of communication from the power transmitting device.

A non-contact power feeding system according to the present invention is capable of transmitting power from a power transmitting device to a power receiving device by a magnetic field resonance scheme. The power transmitting device includes first to n-th resonant circuits (n is an integer equal to or larger than 2) having different sizes of coils and resonant frequencies set to a prescribed reference frequency, a power transmission circuit arranged to selectively supply an AC signal to one of the first to n-th resonant circuits, a detection circuit arranged to detect amplitude of current flowing in the coil of the resonant circuit supplied with the AC signal, and a control circuit arranged to control the power transmission circuit. The power receiving device includes a power reception resonant circuit including a power reception coil, and a changing/short-circuiting circuit arranged to change a resonant frequency of the power reception resonant circuit from the reference frequency as a resonant frequency for the power reception, or to short-circuit the power reception coil, prior to power reception from the power transmitting device. The control circuit sequentially supply the AC signal to the first to n-th resonant circuits so as to obtain first to n-th amplitude detected values corresponding to the first to n-th resonant circuits from the detection circuit, prior to the power transmission, in the state where the resonant frequency of the power reception resonant circuit is changed or the power reception coil is short-circuited in the power receiving device, based on a signal of the communication from the power transmitting device, and performs execution control of the power transmission based on the first to n-th amplitude detected values.

Specifically, for example, in the non-contact power feeding system described above, it is preferred that the control circuit should determine presence or absence of a foreign object that is different from the power receiving device and includes a resonant circuit having a resonant frequency set to the reference frequency, based on the first to n-th amplitude detected values, and should enable execution of the power transmission when determining that the foreign object does not exist, while it should disable the execution of the power transmission when determining that the foreign object exists.

Furthermore, for example, in the non-contact power feeding system described above, the control circuit may determine whether to enable or disable the execution of the power transmission by comparing each of the first to n-th amplitude detected values with a predetermined reference value.

Alternatively, for example, in the non-contact power feeding system described above, the control circuit may determine whether to enable or disable the execution of the power transmission by comparing a minimum value of the first to n-th amplitude detected values with a predetermined reference value.

Alternatively, for example, in the non-contact power feeding system described above, it is preferred that the power transmission should be performed using the power transmission circuit and the first resonant circuit, and intensities of magnetic fields generated by the coils of the resonant circuits when the AC signal is supplied to the resonant circuits prior to the power transmission should be smaller than intensity of a magnetic field generated by the coil of the first resonant circuit when the power transmission is performed.

Advantageous Effects of the Invention

According to the present invention, it is possible to provide a power transmitting device and a non-contact power feeding system, which can contribute to prevention of breakage or the like of a foreign object.

BRIEF DESCRIPTION OF DRAWINGS

FIG. 9 is a circuit diagram showing an example a resonant state changing circuit according to the first embodiment of the present invention.

FIG. 10 is a circuit diagram showing of another example of the resonant state changing circuit according to the first embodiment of the present invention.

FIGS. 11A and 11B are respectively a schematic outline view and a schematic internal structural diagram of a foreign object according to the first embodiment of the present invention.

FIG. 14 is an explanatory diagram of first to n-th foreign object detecting connection states used for detecting a foreign object.

FIGS. 18A to 18D are diagrams showing examples of positional relationships among a power feeding table, the electronic device, and the foreign object.

FIG. 19 is a diagram showing one positional relationship among the power feeding table, the electronic device, and the foreign object.

DESCRIPTION OF EMBODIMENTS

Figure 1A:
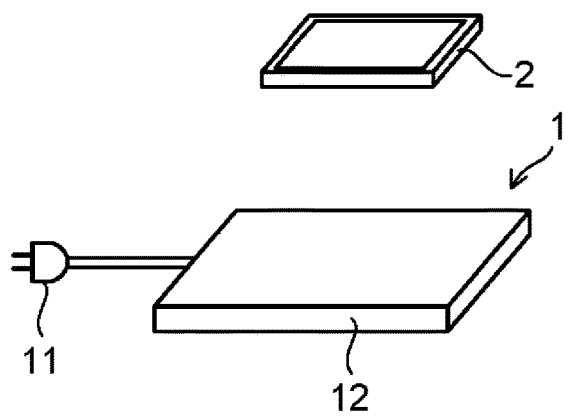
FIGS. 1A and 1B are schematic external views of a power feeding device and an electronic device according to a first embodiment of the present invention.

Hereinafter, examples of embodiments of the present invention are described in detail with reference to the drawings. In the drawings to be referred to, the same portion is denoted by the same numeral, and hence overlapping description of the same portion is omitted as a rule. Note that in this specification, for simple description, a name of information, signal, physical quantity, state quantity, member, or the like may be omitted or abbreviated by referring to numeral or symbol corresponding to the information, signal, physical quantity, state quantity, member, or the like. In addition, in an arbitrary flowchart described later, an order of a plurality of processes can be arbitrarily changed, or the processes can be executed in parallel within a scope in which no contradiction occurs in the process content.

First Embodiment

Figure 1B:
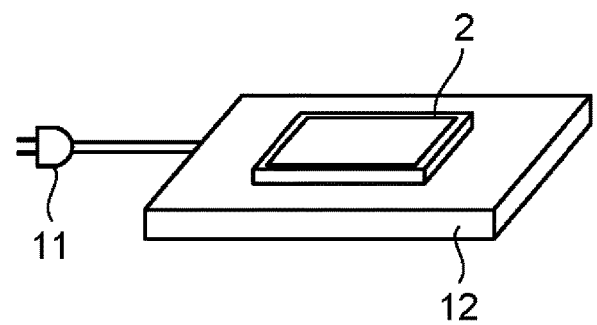

A first embodiment of the present invention is described below. FIGS. 1A and 1B are schematic external views of a power feeding device 1 and an electronic device 2 according to the first embodiment. FIG. 1A is an external view of the power feeding device 1 and the electronic device 2 in a separate state, and FIG. 1B is an external view of the power feeding device 1 and the electronic device 2 in a reference position state. Meanings of the separate state and the reference position state will be described later in detail. The power feeding device 1 and the electronic device 2 constitute a non-contact power feeding system. The power feeding device 1 includes a power plug 11 that receives commercial AC power, and a power feeding table 12 made of resin material.

Figure 2:
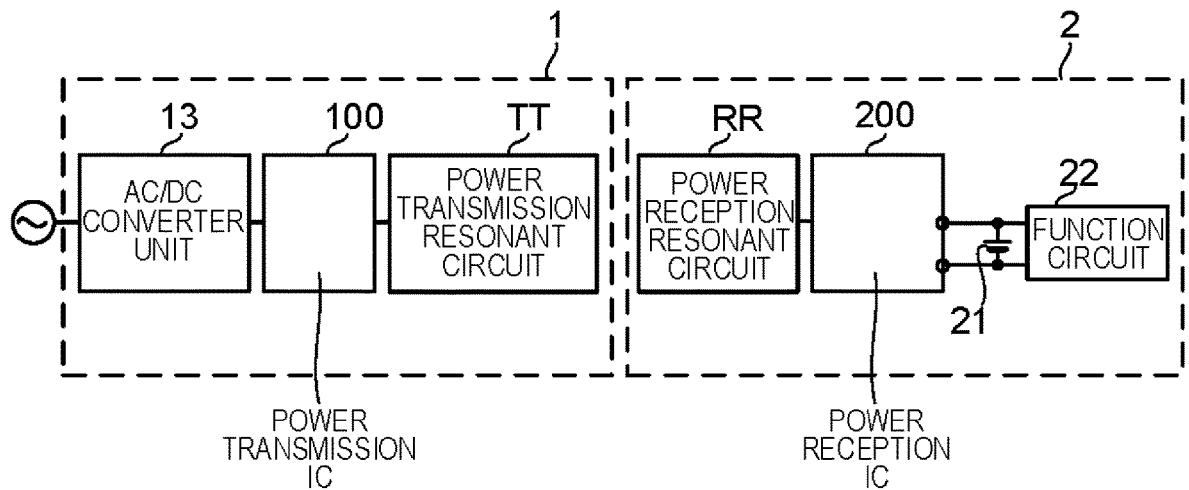
FIG. 2 is a schematic internal structural diagram of the power feeding device and the electronic device according to the first embodiment of the present invention.

FIG. 2 shows a schematic internal structural diagram of the power feeding device 1 and the electronic device 2. The power feeding device 1 includes an AC/DC converter unit 13 that generates a DC voltage having a predetermined voltage value from a commercial AC voltage input via the power plug 11 and outputs the DC voltage, a power transmission IC 100 (hereinafter also referred to as an IC 100) that is an integrated circuit driven by the output voltage of the AC/DC converter unit 13, and a power transmission resonant circuit TT (hereinafter also referred to as a resonant circuit TT) connected to the IC 100. The AC/DC converter unit 13, the power transmission IC 100, and the resonant circuit TT can be disposed in the power feeding table 12. Besides the IC 100, other circuit driven by the output voltage of the AC/DC converter unit 13 can be disposed in the power feeding device 1.

The electronic device 2 includes a power reception IC 200 (hereinafter also referred to as an IC 200) that is an integrated circuit, a power reception resonant circuit RR (hereinafter also referred to as a resonant circuit RR) connected to the IC 200, a battery 21 that is a secondary battery, and a function circuit 22 driven by the output voltage of the battery 21. Although details will be described later, the IC 200 can supply charging power to the battery 21. The IC 200 may be driven by the output voltage of the battery 21 or by a voltage from a voltage source other than the battery 21. Alternatively, a DC voltage obtained by rectifying a signal for NFC communication (details will be described later) received from the power feeding device 1 may be a drive voltage of the IC 200. In this case, even if the battery 21 runs out, the IC 200 can be driven.

The electronic device 2 may be an arbitrary electronic device such as a cellular phone (including a cellular phone classified as a smartphone), a portable information terminal, a tablet personal computer, a digital camera, an MP3 player, a pedometer, or a Bluetooth (registered trademark) headset. The function circuit 22 realizes an arbitrary function to be realized by the electronic device 2. Therefore, for example, when the electronic device 2 is a smartphone, the function circuit 22 includes a telephone processing unit that realizes telephone conversation with a device on the other party, a communication processing unit that sends and receives information to and from other devices via a network, and the like. Alternatively, for example, when the electronic device 2 is a digital camera, the function circuit 22 includes a driving circuit that drives an image sensor, an image processing circuit that generates image data from an output signal of the image sensor, and the like. The function circuit 22 can be considered to be a circuit disposed in an external device of the electronic device 2.

Figure 3:
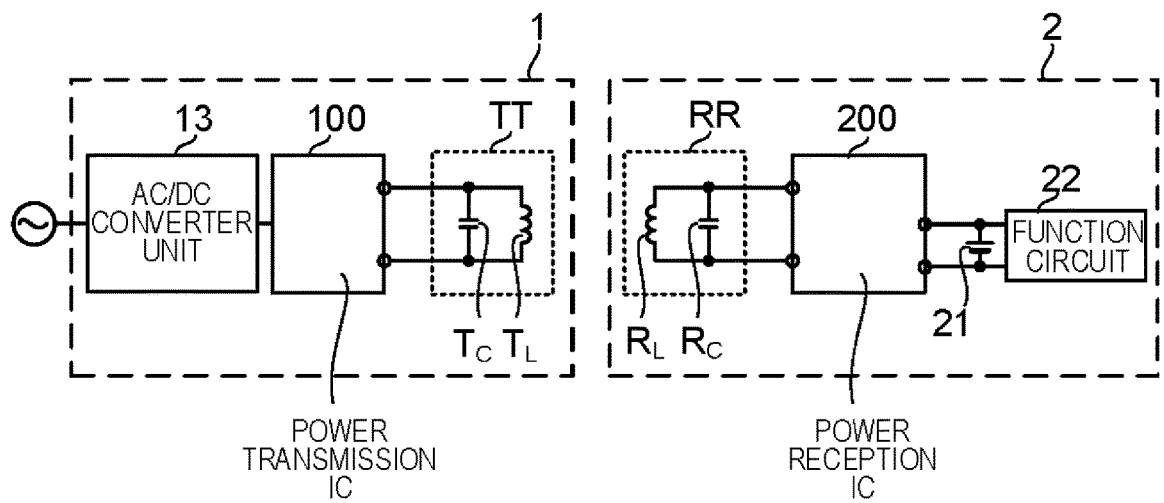
FIG. 3 is a schematic internal structural diagram of the power feeding device and the electronic device according to the first embodiment of the present invention.

As shown in FIG. 3, the resonant circuit TT includes a coil $T_L$ that is a power transmission coil, and a capacitor $T_C$ that is a power transmission capacitor, while the resonant circuit RR includes a coil $R_L$ that is a power reception coil, and a capacitor $R_C$ that is a power reception capacitor. In the following description, for specific description, unless otherwise noted, it is supposed that the power transmission coil $T_L$ and the power transmission capacitor $T_C$ are connected in parallel to each other so that a resonant circuit TT is formed as a parallel resonant circuit, while the power reception coil $R_L$ and the power reception capacitor $R_C$ are connected in parallel to each other so that a resonant circuit RR is formed as a parallel resonant circuit. However, it is possible that the power transmission coil $T_L$ and the power transmission capacitor $T_C$ are connected in series to each other so that the resonant circuit TT is formed as a series resonant circuit, while the power reception coil $R_L$ and the power reception capacitor $R_C$ are connected in series to each other so that the resonant circuit RR is formed as a series resonant circuit.

When the electronic device 2 is placed within a predetermined range on the power feeding table 12 as shown in FIG. 1B, communication as well as power transmission and reception between the devices 1 and 2 can be performed by a magnetic field resonance scheme (i.e. by using magnetic field). The magnetic field resonance is also called magnetic field oscillation or the like.

The communication between the devices 1 and 2 is wireless communication with near field communication (NFC) (hereinafter referred to as NFC communication), which uses a carrier frequency of 13.56 MHz (megahertz). In the following description, the frequency of 13.56 MHz is referred to as a reference frequency. The NFC communication between the devices 1 and 2 is performed by the magnetic field resonance scheme using the resonant circuits TT and RR, and hence resonant frequencies of the resonant circuits TT and RR are both set to the reference frequency. However, as described later, the resonant frequency of the resonant circuit RR can be temporarily changed from the reference frequency.

The power transmission and reception between the devices 1 and 2 includes power transmission from the power feeding device 1 to the electronic device 2 using NFC and power reception in the electronic device 2 using NFC. The power transmission and the power reception are collectively referred to as NFC power transfer or simply as power transfer. Using the magnetic field resonance scheme, power is transferred from the coil $T_L$ to the coil $R_L$, and thus the power transfer is realized in a non-contact manner.

In the power transfer using the magnetic field resonance, alternating current is made to flow in the power transmission coil $T_L$, and hence alternating magnetic field having the reference frequency is generated in the power transmission coil $T_L$. Then, this alternating magnetic field propagates to the resonant circuit RR that causes resonance (i.e. resonant oscillation) at the reference frequency, so that alternating current flows in the power reception coil $R_L$. In other words, the power is transferred from the resonant circuit TT including the power transmission coil $T_L$ to the resonant circuit RR including the power reception coil $R_L$. Note that although it may be omitted in the following description, the magnetic field generated by the coil $T_L$ or the coil $R_L$ in the NFC communication or power transfer is an alternating magnetic field that oscillates at the reference frequency unless otherwise noted.

A state where the electronic device 2 is placed within a predetermined range on the power feeding table 12 so that the NFC communication and power transfer described above can be realized is referred to as a reference position state (see FIG. 1B). When using magnetic resonance, communication and power transfer can be performed even if a distance to an opponent is relatively large, but if the electronic device 2 is apart from the power feeding table 12 by a certain distance, the NFC communication and power transfer cannot be realized. A state where the electronic device 2 is sufficiently apart from the power feeding table 12 so that the NFC communication and power transfer described above cannot be realized is referred to as a separate state (see FIG. 1A). Note that the power feeding table 12 shown in FIG. 1A has a flat surface, but a recess or the like corresponding to a shape of the electronic device 2 to be placed may be formed in the power feeding table 12.

Figure 4:
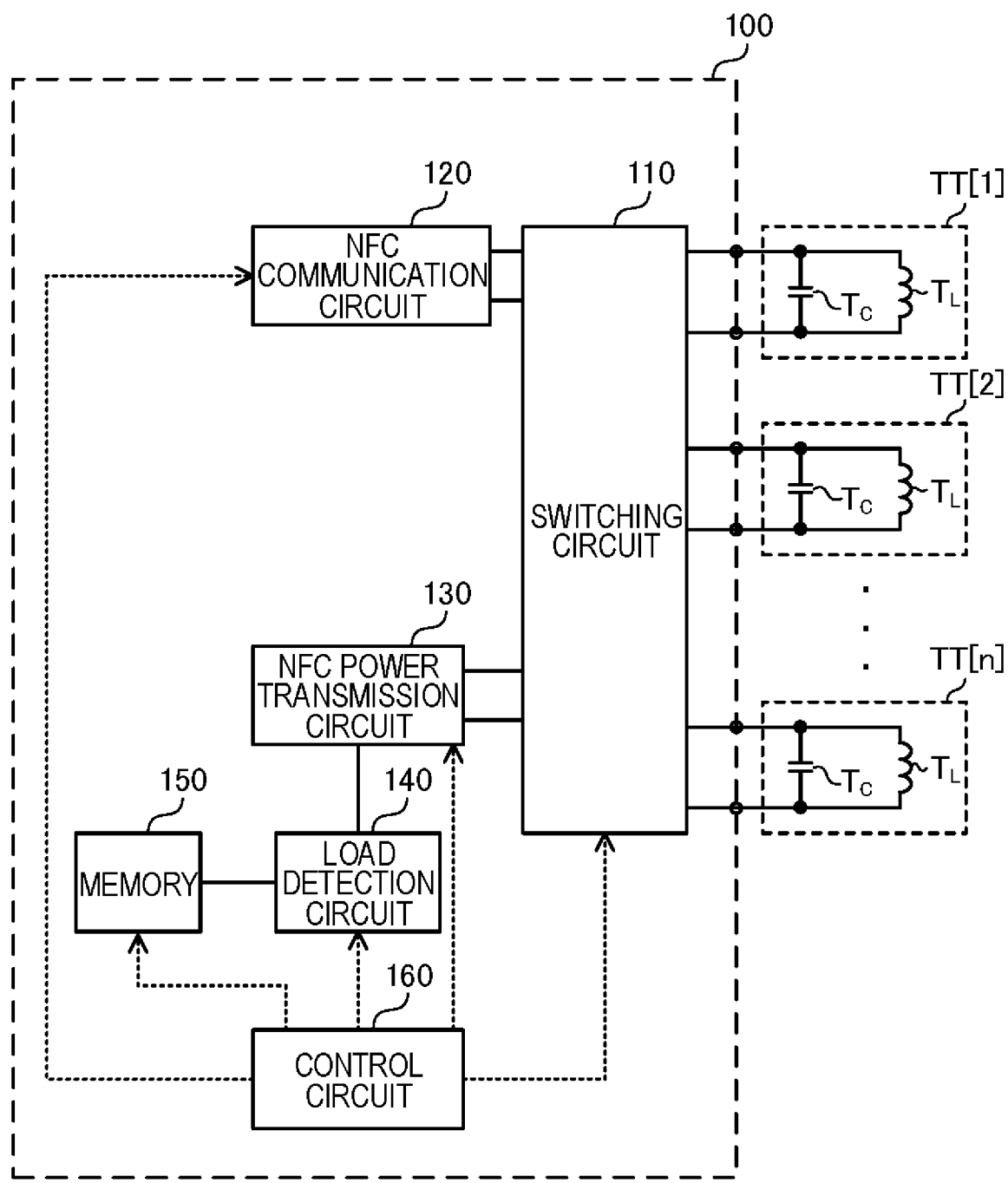
FIG. 4 is a partial structural diagram of the power feeding device including an internal block diagram of an IC in the power feeding device according to the first embodiment of the present invention.

FIG. 4 shows a structural diagram of a part of the power feeding device 1 including an internal block diagram of the IC 100. The IC 100 includes individual portions denoted by numerals 110, 120, 130, 140, 150, and 160. Although not shown in FIGS. 2 and 3, the power feeding device 1 is provided with n resonant circuits TT, which are connected to the IC 100. If it is necessary to distinguish the n resonant circuits TT from each other, n resonant circuits TT are denoted by symbols TT[1] to TT[n]. n is an arbitrary integer equal to or larger than 2. Resonant frequencies of the resonant circuits TT[1] to TT[n] are all set to the reference frequency. As described later in detail, the NFC communication and power transfer is realized using the resonant circuit TT[1], while the resonant circuits TT[2] to TT[n] are used in an auxiliary manner in a foreign object detecting process described later. In the following description, when simply mentioned as the coil $T_L$, it is understood to be the coil $T_L$ in mainly the resonant circuit TT[1], but it may be understood to be the coil $T_L$ in any one of the resonant circuits TT[1] to TT[n]. The same is true for the capacitor $T_C$.

Figure 5:
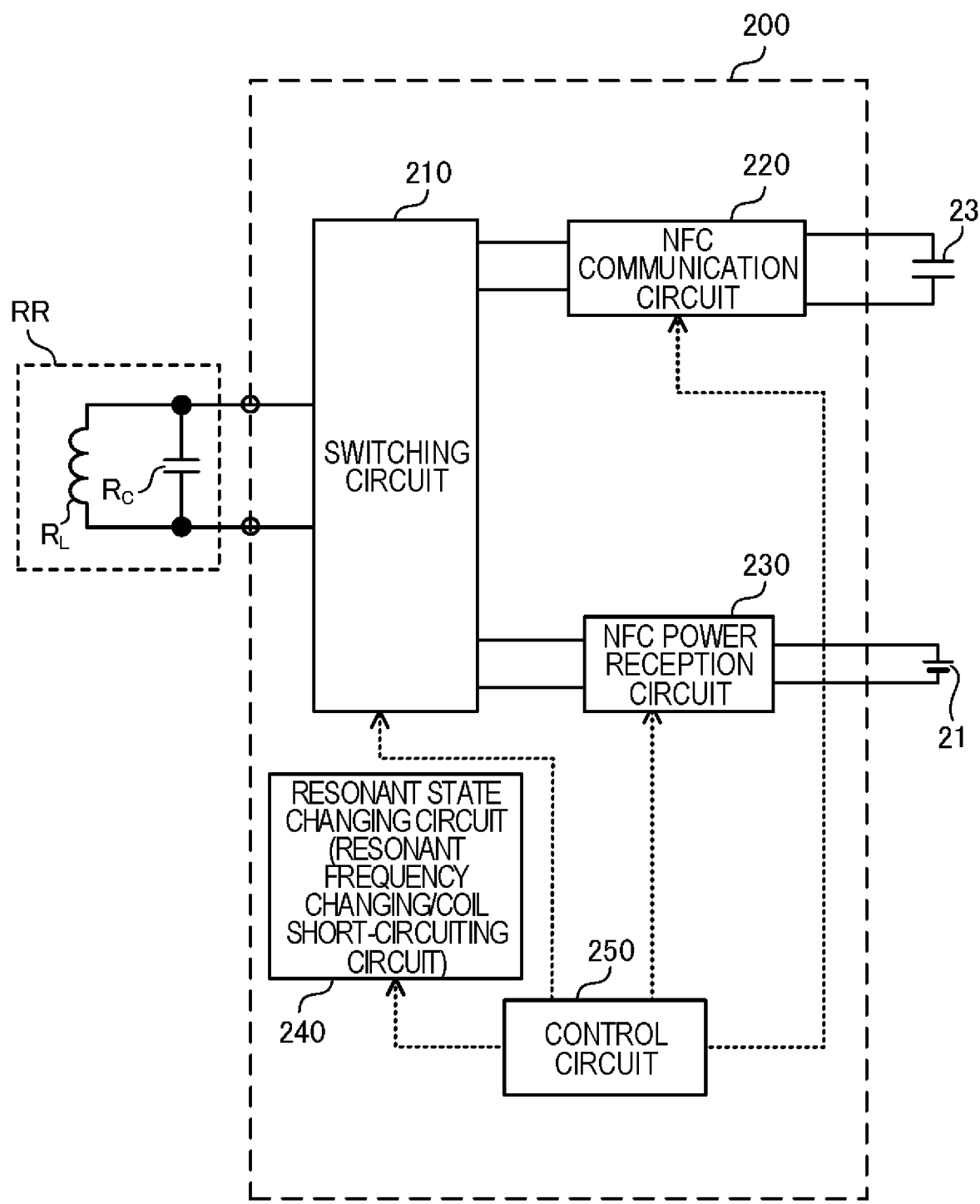
FIG. 5 is a partial structural diagram of the electronic device including an internal block diagram of an IC in the electronic device according to the first embodiment of the present invention.

FIG. 5 shows a structural diagram of a part of the electronic device 2 including an internal block diagram of the IC 200. The IC 200 includes individual portions denoted by numerals 210, 220, 230, 240, and 250. In addition, a capacitor 23 that outputs a drive voltage of the IC 200 may be connected to the IC 200. The capacitor 23 can output the DC voltage obtained by rectifying the signal for NFC communication received from the power feeding device 1.

Under control by the control circuit 160, the switching circuit 110 connects the resonant circuit TT[1] to one of the NFC communication circuit 120 and the NFC power transmission circuit 130, or disconnect the resonant circuit TT[1] from the NFC communication circuit 120 and the NFC power transmission circuit 130. When the resonant circuit TT[1] is disconnected from the NFC communication circuit 120 and the NFC power transmission circuit 130, the switching circuit 110 can connect the NFC power transmission circuit 130 to one of the resonant circuits TT[2] to TT[n] under control by the control circuit 160. It is possible that the NFC communication circuit 120 can be connected to the resonant circuits TT[2] to TT[n] by the switching circuit 110, but in this example, it is supposed that the NFC communication circuit 120 is not connected to the resonant circuits TT[2] to TT[n]. A plurality of switches disposed between the resonant circuits TT[1] to TT[n] and the circuits 120 and 130 can constitute the switching circuit 110. Any switch described in this specification may be constituted of a semiconductor switching element such as a field-effect transistor.

Under control by the control circuit 250, the switching circuit 210 connects the resonant circuit RR to either one of the NFC communication circuit 220 and the NFC power reception circuit 230. A plurality of switches disposed between the resonant circuit RR and the circuits 220 and 230 can constitute the switching circuit 210.

A state where the resonant circuit TT[1] is connected to the NFC communication circuit 120 via the switching circuit 110 while the resonant circuit RR is connected to the NFC communication circuit 220 via the switching circuit 210 is referred to as a communication connection state. The NFC communication can be performed in the communication connection state. In the communication connection state, the NFC communication circuit 120 can supply an AC signal (alternating current) having the reference frequency to the resonant circuit TT[1]. The NFC communication between the devices 1 and 2 is performed by half duplex method.

When the power feeding device 1 is a transmission side in the communication connection state, an arbitrary information signal is superimposed on the AC signal supplied from the NFC communication circuit 120 to the resonant circuit TT[1], so that the information signal is transmitted from the coil $T_L$ of the resonant circuit TT[1] as an antenna coil on the power feeding device side and is received by the coil $R_L$ of the resonant circuit RR as the antenna coil on the electronic device side. The information signal received by the coil $R_L$ is extracted by the NFC communication circuit 220. When the electronic device 2 is the transmission side in the communication connection state, the NFC communication circuit 220 can transmit an arbitrary information signal (response signal) from the coil $R_L$ of the resonant circuit RR to the coil $T_L$ of the resonant circuit TT[1]. As known well, this transmission is realized by a load modulation scheme in which an impedance of the coil $R_L$ of the resonant circuit RR (antenna coil on the electronic device side) viewed from the coil $T_L$ of the resonant circuit TT[1] (antenna coil on the power feeding device side) is changed based on ISO standard (e.g. ISO14443 standard). The information signal transmitted from the electronic device 2 is extracted by the NFC communication circuit 120.

A state where the resonant circuit TT[1] is connected to the NFC power transmission circuit 130 via the switching circuit 110 while the resonant circuit RR is connected to the NFC power reception circuit 230 via the switching circuit 210 is referred to as a power feeding connection state.

In the power feeding connection state, the NFC power transmission circuit 130 can perform a power transmission operation, while the NFC power reception circuit 230 can perform a power reception operation. The power transmission operation and the power reception operation realize the power transfer. In the power transmission operation, the power transmission circuit 130 supplies a power transmission AC signal having the reference frequency (power transmission alternating current) to the resonant circuit TT[1] so as to generate a power transmission magnetic field having the reference frequency (power transmission alternating magnetic field) in the power transmission coil $T_L$ of the resonant circuit TT[1], and thus power transmission is performed from the resonant circuit TT[1] (power transmission coil $T_L$) to the resonant circuit RR by the magnetic field resonance scheme. The power received by the power reception coil $R_L$ based on the power transmission operation is sent to the power reception circuit 230, and in the power reception operation, the power reception circuit 230 generates arbitrary DC power from the received power and outputs the same. The output power of the power reception circuit 230 can charge the battery 21.

Figure 6:
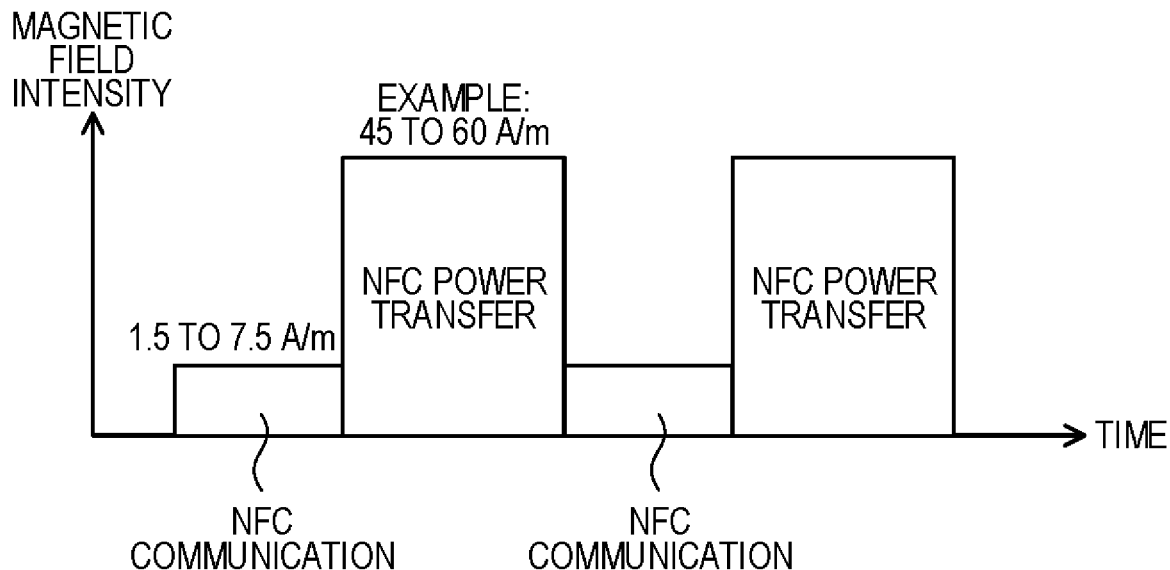
FIG. 6 is a diagram showing a manner in which magnetic field intensity is changed when NFC communication and power transfer are alternately performed.

Also when performing the NFC communication in the communication connection state, the coil $T_L$ or $R_L$ generates a magnetic field, and magnetic field intensity in the NFC communication is within a predetermined range. A lower limit value and an upper limit value of the range are defined in the NFC standard and are respectively 1.5 A/m and 7.5 A/m. In contrast, intensity of the magnetic field generated by the power transmission coil $T_L$ of the resonant circuit TT[1] in the power transfer (i.e. power transmission operation) (magnetic field intensity of the power transmission magnetic field) is larger than the upper limit value described above and is approximately 45 to 60 A/m, for example. In the non-contact power feeding system including the devices 1 and 2, the NFC communication and the power transfer (NFC power transfer) can be alternately performed, and the magnetic field intensity in this case is shown in FIG. 6.

Figure 7:
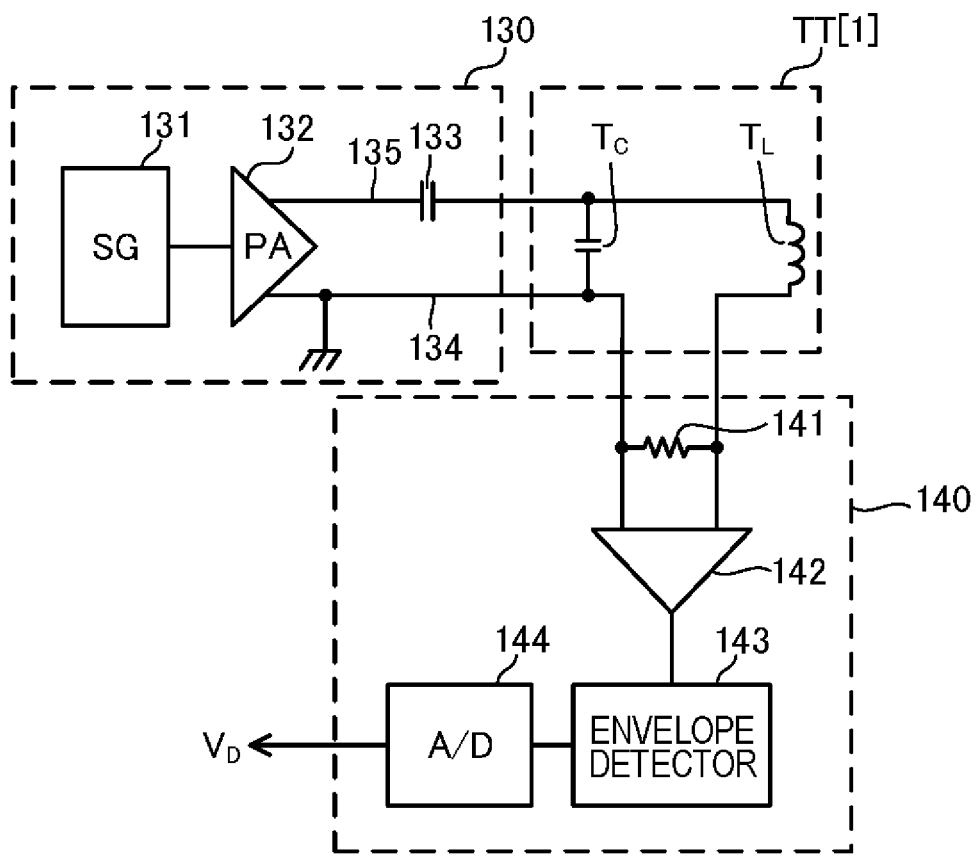
FIG. 7 is a diagram showing a relationship among a power transmission circuit, a load detection circuit, and a resonant circuit in the power feeding device.

The load detection circuit 140 detects a magnitude of a load of the power transmission coil $T_L$, i.e. a magnitude of a load for the power transmission coil $T_L$ when the AC signal (alternating current) is supplied from the power transmission circuit 130 to the power transmission coil $T_L$. FIG. 7 shows a relationship among the power transmission circuit 130, the load detection circuit 140, and the resonant circuit TT[1] in the power feeding connection state. Note that the switching circuit 110 is not shown in FIG. 7.

The power transmission circuit 130 includes a signal generator 131 that generates a sine wave signal having the reference frequency, an amplifier (power amplifier) 132 that amplifies a sine wave signal generated by the signal generator 131 so as to output the amplified sine wave signal between lines 134 and 135 with reference to the potential of the line 134, and a capacitor 133. On the other hand, the load detection circuit 140 includes a sense resistor 141, an amplifier 142, an envelope detector 143 and an A/D converter 144. The signal intensity of the sine wave signal generated by the signal generator 131 is fixed to a constant value, but an amplification factor of the amplifier 132 is set by the control circuit 160 in a variable manner.

One terminal of the capacitor 133 is connected to the line 135. In the power feeding connection state, the other terminal of the capacitor 133 is commonly connected to one terminal of each of the capacitor $T_C$ and the coil $T_L$ of the resonant circuit TT[1], and the other terminal of the coil $T_L$ of the resonant circuit TT[1] is commonly connected to the line 134 and the other terminal of the capacitor $T_C$ of the resonant circuit TT[1] via the sense resistor 141.

Figure 8:
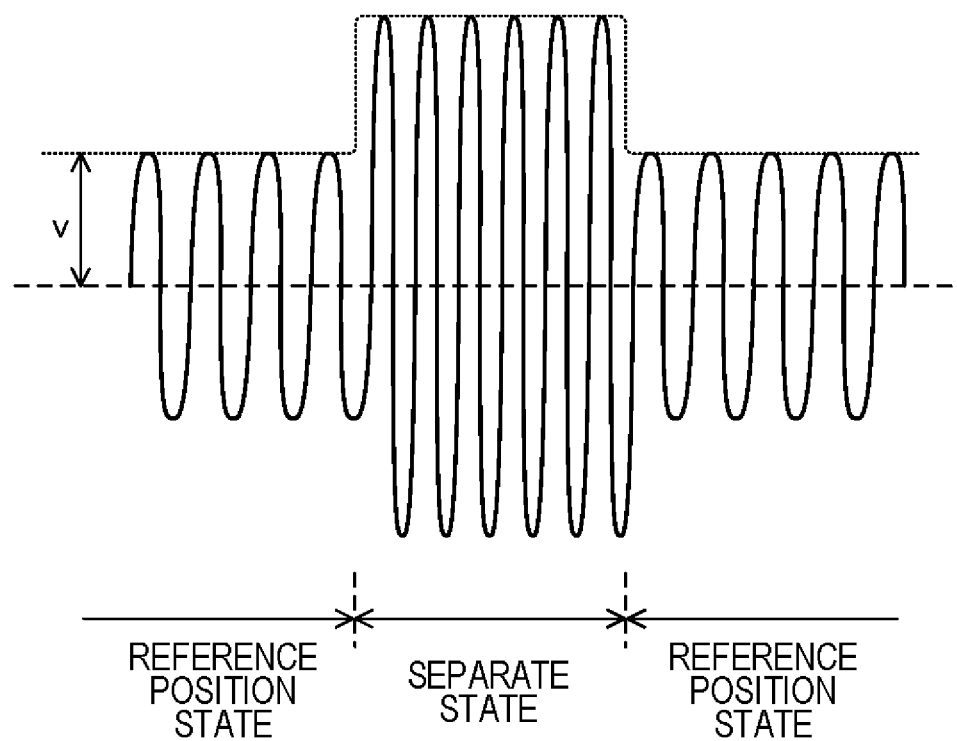
FIG. 8 is a waveform diagram of a voltage drop of a sense resistor in the load detection circuit of FIG. 7.
Figure 12A:
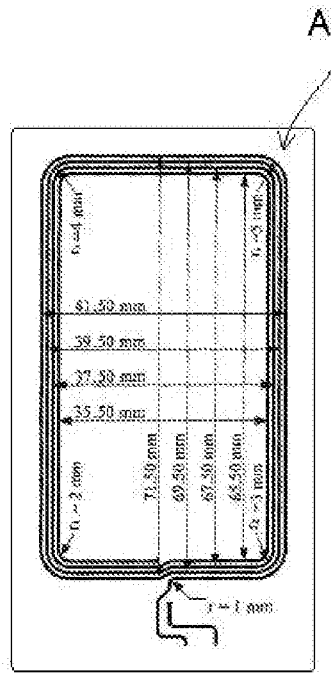
FIGS. 12A to 12F are diagrams showing examples of an antenna coil to be mounted in a non-contact IC card.
Figure 12B:
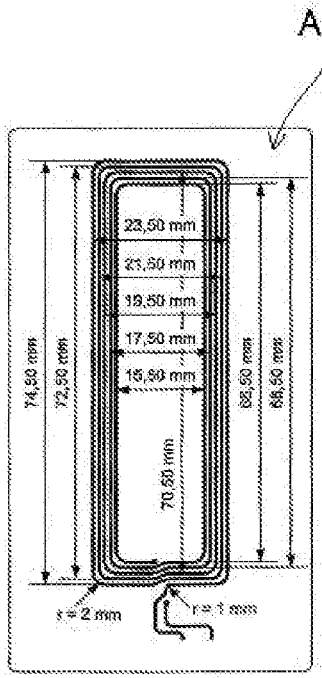
Figure 12C:
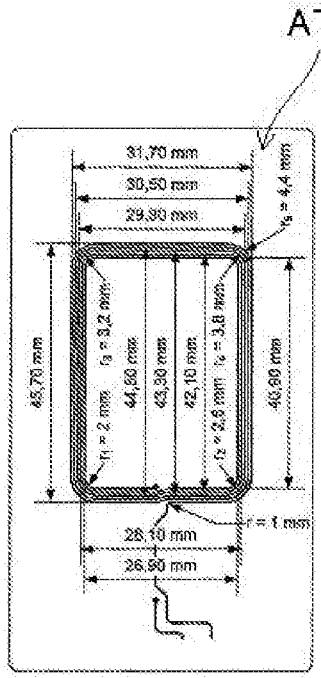
Figure 12D:
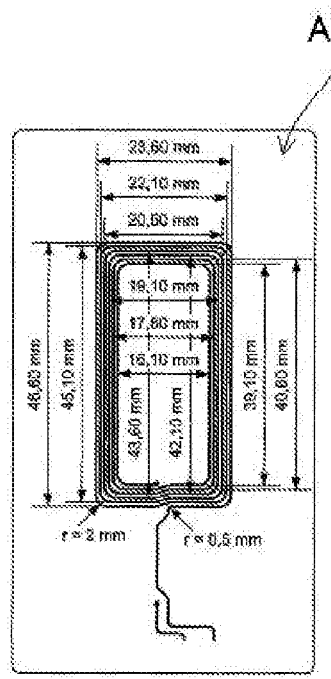
Figure 12E:
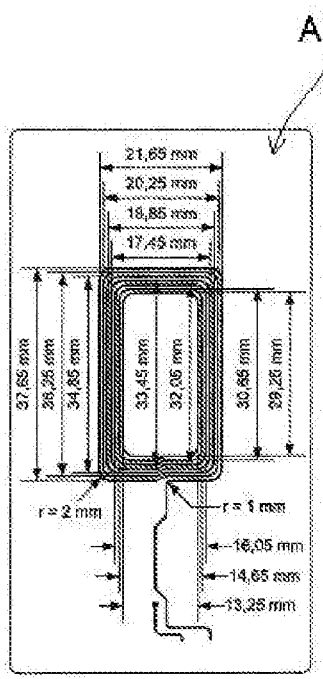
Figure 12F:
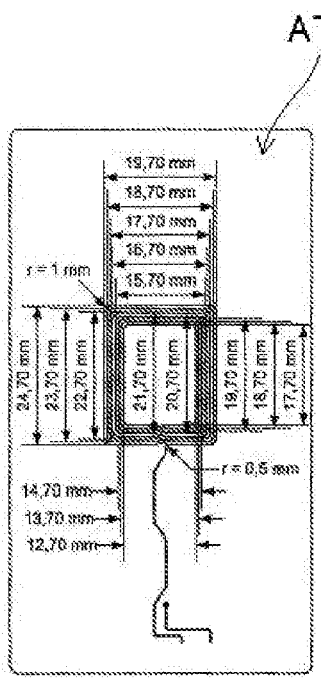

The power transmission operation is realized by supplying the AC signal from the amplifier 132 to the resonant circuit TT via the capacitor 133. In the power feeding connection state, when the AC signal is supplied from the amplifier 132 to the resonant circuit TT[1], alternating current having the reference frequency flows in the power transmission coil $T_L$ of the resonant circuit TT[1], and consequently an AC voltage drop is generated in the sense resistor 141. A solid line waveform in FIG. 8 is a voltage waveform of the voltage drop in the sense resistor 141. As to the resonant circuit TT[1], under the condition of constant intensity of the magnetic field generated by the power transmission coil $T_L$, when the electronic device 2 is made to approach the power feeding table 12, current based on the magnetic field generated by the power transmission coil $T_L$ flows in the power reception coil $R_L$, while a counter electromotive force based on the current that has flowed in the power reception coil $R_L$ is generated in the power transmission coil $T_L$, and the counter electromotive force acts so as to reduce the current flowing in the power transmission coil $T_L$. For this reason, as shown in FIG. 8, a voltage drop amplitude of the sense resistor 141 in the reference position state is smaller than that in the separate state.

The amplifier 142 amplifies the voltage drop signal of the sense resistor 141. The envelope detector 143 detects the envelope of the signal amplified by the amplifier 142, so as to output an analog voltage signal proportional to a voltage v of FIG. 8. The A/D converter 144 converts the output voltage signal of the envelope detector 143 into a digital signal so as to output a digital voltage value $V_D$. As understood from the above description, the voltage value $V_D$ is proportional to an amplitude of current flowing in the sense resistor 141 (therefor an amplitude of current flowing in the power transmission coil $T_L$). Therefore, the load detection circuit 140 can be said to detect the amplitude of current flowing in the power transmission coil $T_L$, and the detected value of the amplitude can be considered to be the voltage value $V_D$.

For the power transmission coil $T_L$ that generates the magnetic field, the coil such as the power reception coil $R_L$ that is magnetically coupled with the power transmission coil $T_L$ can be considered as a load, and the voltage value $V_D$ as the detected value of the load detection circuit 140 varies depending on the magnitude of the load. For this reason, it can be considered that the load detection circuit 140 detects the magnitude of the load based on the output of the voltage value $V_D$. The magnitude of the load can be said to be a magnitude of the load for the power transmission coil $T_L$ in the power transmission, or to be a magnitude of the load of the electronic device 2 viewed from the power feeding device 1 in the power transmission. Note that the sense resistor 141 may be disposed in the IC 100 or may be disposed outside of the IC 100.

The memory 150 (see FIG. 4) is constituted of a non-volatile memory and stores arbitrary information in a non-volatile manner. The control circuit 160 integrally controls operations of the individual portions in the IC 100. The control performed by the control circuit 160 includes, for example, switching operation control of the switching circuit 110, content control and execution or non-execution control of the communication operation and the power transmission operation by the communication circuit 120 and the power transmission circuit 130, operation control of the load detection circuit 140, and storage control and read control of the memory 150. The control circuit 160 includes a timer (not shown) and can measure a time length between arbitrary timings.

The resonant state changing circuit 240 (see FIG. 5) in the electronic device 2 is a resonant frequency changing circuit that changes resonant frequency of the resonant circuit RR from the reference frequency to another predetermined frequency $f_M$, or a coil short-circuiting circuit that short-circuits the power reception coil $R_L$ of the resonant circuit RR.

A resonant frequency changing circuit 240A of FIG. 9 is an example of the resonant frequency changing circuit as the resonant state changing circuit 240. The resonant frequency changing circuit 240A is constituted of a series circuit of a capacitor 241 and a switch 242, and one terminal of the series circuit is commonly connected to one terminal of the capacitor $R_C$ and one terminal of the coil $R_L$, while the other terminal of the series circuit is commonly connected to the other terminal of the capacitor $R_C$ and the other terminal of the coil $R_L$. The switch 242 is turned on or off under control by the control circuit 250. When the switch 242 is turned off, the capacitor 241 is separated from the capacitor $R_C$ and the coil $R_L$, and hence the resonant circuit RR is constituted of only the coil $R_L$ and the capacitor $R_C$ ignoring a parasitic inductance and a parasitic capacitance, and the resonant frequency of the resonant circuit RR is the same as the reference frequency. In other words, when the switch 242 is turned off, the power reception capacitance that determines the resonant frequency of the resonant circuit RR is the capacitor $R_C$ itself. When the switch 242 is turned on, the capacitor 241 is connected in parallel to the capacitor $R_C$, and hence the resonant circuit RR is constituted of the coil $R_L$ and the combined capacitance of the capacitors $R_C$ and 241. As a result, the resonant frequency of the resonant circuit RR becomes a frequency $f_M$ lower than the reference frequency. In other words, when the switch 242 is turned on, the power reception capacitance that determines the resonant frequency of the resonant circuit RR is the combined capacitance described above. In this example, when the switch 242 is turned on, it is supposed that the frequency $f_M$ is apart from the reference frequency to the extent that the resonant circuit RR does not function as a load of the power transmission coil $T_L$ (i.e. to the extent that the magnetic resonance is not sufficiently generated between the resonant circuits TT[i] and RR) (i is an integer). For example, the resonant frequency of the resonant circuit RR (i.e. frequency $f_M$) when the switch 242 is turned on is a few hundred kilohertz to 1 megahertz.

As long as the resonant frequency of the resonant circuit RR can be changed to the frequency $f_M$, the resonant frequency changing circuit as the changing circuit 240 is not limited to the resonant frequency changing circuit 240A, and the frequency $f_M$ may be higher than the reference frequency. In other words, considering that the power reception resonant circuit RR can be a series resonant circuit, the following can be said. The power reception resonant circuit RR includes a parallel circuit or a series circuit of the power reception coil ($R_L$) and the power reception capacitance, and a resonant frequency $f_O$ of the power reception resonant circuit RR is the same as the reference frequency when the power reception capacitance is the same as a predetermined reference capacitance. The resonant frequency changing circuit increases or decreases the power reception capacitance from the reference capacitance at necessary timing. In this way, in the power reception resonant circuit RR, the power reception coil ($R_L$) and the power reception capacitance larger or smaller than the reference capacitance constitute the parallel circuit or the series circuit, and consequently the resonant frequency $f_O$ of the power reception resonant circuit RR is changed from the reference frequency.

A coil short-circuiting circuit 240B of FIG. 10 is an example of the coil short-circuiting circuit as the resonant state changing circuit 240. The coil short-circuiting circuit 240B is constituted of a switch 243 connected (inserted) between a node at which one terminal of the capacitor $R_C$ and one terminal of the coil $R_L$ of the resonant circuit RR are commonly connected and a node at which the other terminal of the capacitor $R_C$ and the other terminal of the coil $R_L$ of the resonant circuit RR are commonly connected. The switch 243 is turned on or off under control by the control circuit 250. When the switch 243 is turned on, the coil $R_L$ of the resonant circuit RR is short-circuited (more specifically, both terminals of the coil $R_L$ are short-circuited). In a state where the power reception coil $R_L$ is short-circuited, the power reception resonant circuit RR does not exist (becomes a state equivalent to a state where the power reception resonant circuit RR does not exist). Therefore, during a period while the power reception coil $R_L$ is short-circuited, the load for the power transmission coil $T_L$ is sufficiently small (i.e. becomes a state as if the electronic device 2 does not exist on the power feeding table 12). As long as the power reception coil $R_L$ can be short-circuited, the coil short-circuiting circuit as the changing circuit 240 is not limited to the coil short-circuiting circuit 240B.

In the following example, the operation of changing the resonant frequency $f_O$ of the power reception resonant circuit RR from the reference frequency to the predetermined frequency $f_M$ is referred to as a resonant frequency changing operation, and the operation of short-circuiting the power reception coil $R_L$ using the coil short-circuiting circuit is referred to as a coil short-circuit operation. In addition, for simple description, the resonant frequency changing operation or the coil short-circuit operation may be referred to as a $f_O$ change/short-circuit operation.

The control circuit 250 (see FIG. 5) integrally controls operations of the individual portions in the IC 200. The control performed by the control circuit 250 includes, for example, switching operation control of the switching circuit 210, content control and execution or non-execution control of the communication operation and the power reception operation by the communication circuit 220 and the power reception circuit 230, and the operation control of the changing circuit 240. The control circuit 250 includes a timer (not shown) and can measure a time length between arbitrary timings. For example, the timer in the control circuit 250 can measure time during which the change of the resonant frequency $f_O$ to the predetermined frequency $f_M$ or the short-circuit of the power reception coil $R_L$ by the $f_O$ change/short-circuit operation is maintained (i.e. can measure time $T_M$ described later; see Step S207 in FIG. 23).

The control circuit 160 of the power feeding device 1 can control the power transmission circuit 130 so as to determine presence or absence of a foreign object on the power feeding table 12 and to perform the power transmission operation only when there is no foreign object. Meaning of the foreign object is described below. FIG. 11A shows a schematic outline view of a foreign object 3, and FIG. 11B shows a schematic internal structural diagram of the foreign object 3. The foreign object 3 includes a resonant circuit JJ constituted of a parallel circuit of a coil $J_L$ and a capacitor $J_C$, and a circuit 300 in the foreign object connected to the resonant circuit JJ. The resonant frequency of the resonant circuit JJ is set to the reference frequency. Unlike the electronic device 2, the foreign object 3 is a device that does not correspond to the power feeding device 1. For example, the foreign object 3 is an object including a wireless IC tag having a 13.56 MHz antenna coil (coil $J_L$), which does not respond to the NFC communication (such as a non-contact IC card). In addition, for example, the foreign object 3 is an electronic device that includes the NFC communication function itself though the function is disabled. For example, a smartphone that has the NFC communication function though the function is turned off by software setting can be the foreign object 3. In addition, a smartphone having no power receiving function though the NFC communication function is enabled is also classified as the foreign object 3.

In a state where such the foreign object 3 is placed on the power feeding table 12, if the power feeding device 1 performs the power transmission operation, the foreign object 3 may be broken by a strong magnetic field generated by the power transmission coil $T_L$ (e.g. a magnetic field having magnetic field intensity of 12 A/m or higher). For example, the strong magnetic field in the power transmission operation may increase a terminal voltage of the coil $J_L$ in the foreign object 3 on the power feeding table 12 up to 100 V to 200 V, and the foreign object 3 is broken if the foreign object 3 is not formed to withstand such high voltage.

The load for the power transmission coil $T_L$ is increased when the foreign object 3 exists, and hence a current amplitude of the power transmission coil $T_L$ is decreased. Using this characteristic, it is possible to determine presence or absence of the foreign object 3 based on the amplitude. However, the antenna coil (coil $J_L$) of the foreign object 3 can have various shapes, and depending on the shape the current amplitude due to existence of the foreign object 3 can variously change.

With reference to FIGS. 12A to 12F, the following description is added. Symbols AT1 to AT6 denote reference antenna coils defined as antenna coils to be mounted in the non-contact IC card by the ISO14443 standard. A non-contact IC card including one of the antenna coils AT1 to AT6 as the coil $J_L$ of FIG. 11B can be the foreign object 3. The antenna coils AT1 to AT6 have different shapes, and sizes of the antenna coils are basically decreased from AT1 to AT6. In this specification, shape of the coil is a concept including size of the coil. Therefore, even if there is a similarity between the first coil and the second coil, if they have different sizes, then the first coil and the second coil have different shapes. As to an arbitrary coil, size of the coil can be considered to indicate an area enclosed by a periphery of the coil in a direction perpendicular to the center axis of the coil. If the coil forms a loop antenna, an area of a part enclosed by coil winding on the loop surface of the loop antenna (i.e. the surface on which the coil winding is disposed) corresponds to the size of the coil.

The power transmission coil $T_L$ of the resonant circuit TT[1] used in the NFC communication and power transfer may be any one of the antenna coils AT1 to AT6, but it is supposed in this example that the same antenna coil as the antenna coil AT6 is used as the power transmission coil $T_L$ of the resonant circuit TT[1]. Corresponding to this, the same antenna coil as the antenna coil AT6 should be used as the power reception coil $R_L$ in the electronic device 2.

When the same antenna coil as the antenna coil AT6 is used as the power transmission coil $T_L$ of the resonant circuit TT[1], if the coil $J_L$ of the foreign object 3 is the antenna coil AT6, a magnetic coupling degree between the power transmission coil $T_L$ of the resonant circuit TT[1] and the coil $J_L$ of the foreign object 3 is relatively large, and hence detection sensitivity of presence or absence of the foreign object 3 using the current amplitude of the power transmission coil $T_L$ of the resonant circuit TT[1] becomes sufficiently large (the change of the voltage v shown in FIG. 8 becomes relatively large between presence and absence of the foreign object 3). However, when the coil $J_L$ of the foreign object 3 is the antenna coil AT1, the magnetic coupling degree between the power transmission coil $T_L$ of the resonant circuit TT[1] and the coil $J_L$ of the foreign object 3 becomes relatively small, detection sensitivity of presence or absence of the foreign object 3 using the current amplitude of the power transmission coil $T_L$ of the resonant circuit TT[1] is decreased (the change of the voltage v shown in FIG. 8 becomes relatively small between presence and absence of the foreign object 3), and the detection accuracy of presence or absence of the foreign object 3 is decreased.

Considering this, in this embodiment, the resonant circuits TT[2] to TT[n] are disposed in the power feeding device 1 in addition to the resonant circuit TT[1], so that the foreign object detecting process is performed using the resonant circuits TT[1] to TT[n]. The total n power transmission coils $T_L$ in the resonant circuits TT[1] to TT[n] are antenna coils having different shapes (including different sizes as described above), and if n is 6, for example, the power transmission coils $T_L$ in the resonant circuits TT[2] to TT[6] may have the same shapes as the antenna coils AT1 to AT5, respectively.

Figure 13:
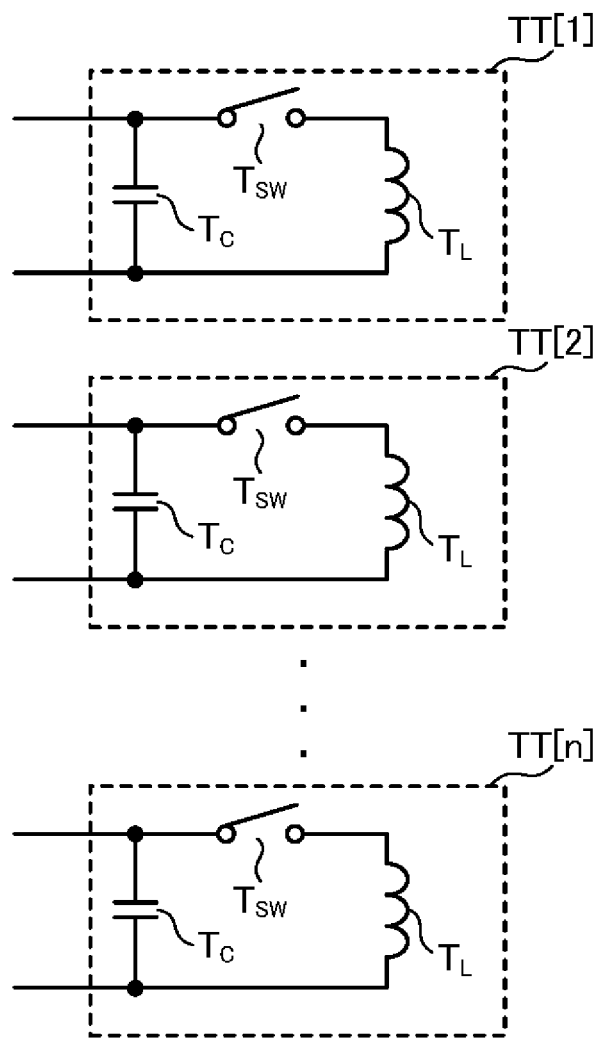
FIG. 13 is a diagram showing a manner in which a switch is disposed in each resonant circuit of the power transmitting device.

However, when performing the foreign object detecting process using the resonant circuit TT[i], it is necessary to prevent that the power transmission coil $T_L$ of the resonant circuit other than the resonant circuit TT[i] might behave like the coil $T_J$ of the foreign object 3. Therefore, although not mentioned in the description above, switches $T_{SW}$ as shown in FIG. 13 are actually provided to the individual resonant circuits TT[1] to TT[n]. Under control by the control circuit 160, the switches $T_{SW}$ of the resonant circuits TT[1] to TT[n] are individually turned on or off. In the resonant circuit TT[i], when the switch $T_{SW}$ is turned on, the coil $T_L$ and the capacitor $T_C$ are connected to each other so that the resonant circuit is formed, while when the switch $T_{SW}$ is turned off, the coil $T_L$ and the capacitor $T_C$ are disconnected so that the resonant circuit is not formed (i is an integer). In this example, because the parallel resonant circuit is assumed, the switch $T_{SW}$ should be inserted in series in the line connecting one terminal of the coil $T_L$ and one terminal of the capacitor $T_C$ so that a current loop via the coil $T_L$ is not formed when the switch $T_{SW}$ is turned off in the resonant circuit TT[i].

Further, the control circuit 160 can control the switching circuit 110 and the switches $T_{SW}$ of the resonant circuits TT[1] to TT[n] so that one of the first to n-th foreign object detecting connection states as shown in FIG. 14 is realized. In the i-th foreign object detecting connection state, the NFC power transmission circuit 130 is connected to only the resonant circuit TT[i] among the resonant circuits TT[1] to TT[n], and the switch $T_{SW}$ of the resonant circuit TT[i] is turned on, while the switches $T_{SW}$ of the resonant circuits other than the resonant circuit TT[i] among the resonant circuits TT[1] to TT[n] are turned off. In the power feeding device 1, the power feeding connection state for performing the power transmission operation is the same as the first foreign object detecting connection state. In addition, in the power feeding device 1, in the communication connection state for performing the NFC communication, the NFC communication circuit 120 is connected to the resonant circuit TT[1] via the switching circuit 110, and the switch $T_{SW}$ of the resonant circuit TT[1] is turned on, while the switches $T_{SW}$ of the resonant circuits TT[2] to TT[n] are turned off.

[Initial Setting Process]

In order to enable to determine presence or absence of a foreign object, a foreign object detecting reference value is stored in the memory 150 in advance in an initial setting process. The initial setting process is performed by the IC 100 under the following initial setting environment. In the initial setting environment, the load for the power transmission coil $T_L$ is nothing or small enough to be ignored, and there is no coil that is magnetically coupled with the power transmission coil $T_L$. In order to ensure this, the device such as the electronic device 2 and the foreign object 3 including the coil is kept away enough from the power feeding table 12. The separate state of FIG. 1A can be considered to satisfy the initial setting environment. In order to ensure the initial setting environment, for example it is possible to perform the initial setting process when the power feeding device 1 is manufactured or shipped. However, as long as the initial setting environment is secured, it is possible to perform the initial setting process at any timing.

Figure 15:
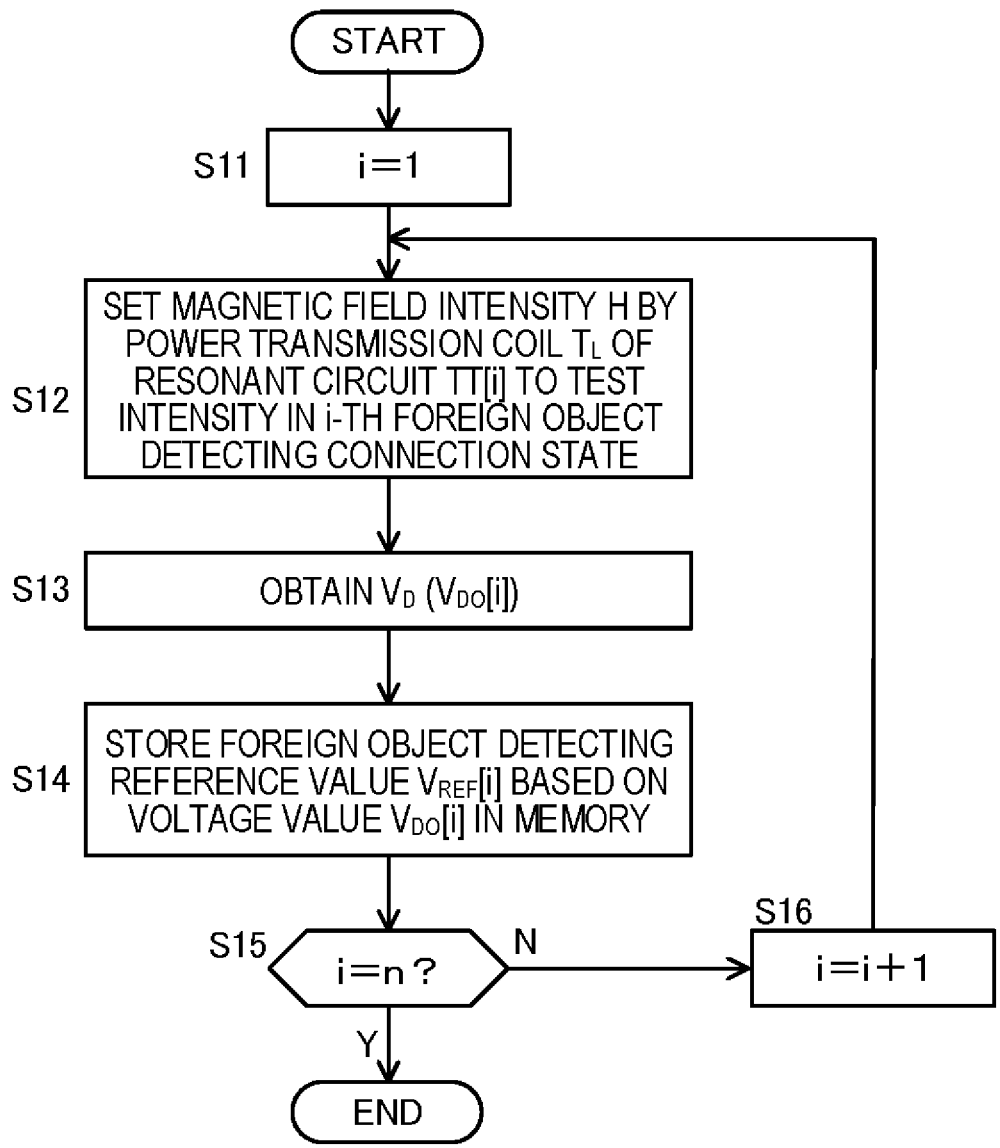
FIG. 15 is an operation flowchart of an initial setting process performed by the power feeding device.

FIG. 15 is an operation flowchart of the initial setting process. In the initial setting process including Steps S11 to S16, the process of Steps S12 to S14 is performed for each of i=1, i=2, . . . , i=n. In Step S12, the control circuit 160 controls the switching circuit 110 and the switches $T_{SW}$ so as to realize the i-th foreign object detecting connection state, and to set magnetic field intensity H by the power transmission coil $T_L$ of the resonant circuit TT[i] to a predetermined test intensity. In next Step S13, the voltage value $V_D$ obtained from the A/D converter 144 in the set state as a voltage value $V_{DO}[i]$. In next Step S14, a foreign object detecting reference value $V_{REF}[i]$ based on the voltage value $V_{DO}[i]$ is stored in the memory 150. The voltage value $V_D$ obtained in the i-th foreign object detecting connection state has a value corresponding to an amplitude of current flowing in the power transmission coil $T_L$ of the resonant circuit TT[i].

The load detection circuit 140 can individually detect the amplitudes of current flowing in the power transmission coils $T_L$ of the resonant circuits TT[1] to TT[n] by the same structure as the structure shown in FIG. 7.

Simply, for example, n detection blocks, each of which is constituted of the sense resistor 141, the amplifier 142, the envelope detector 143, and the A/D converter 144, are disposed in the load detection circuit 140. In this case, in the same manner as the method of disposing the sense resistor 141 in the resonant circuit TT[1], the sense resistor 141 is also disposed in each of the resonant circuits TT[2] to TT[n]. Further, the first to n-th detection blocks are assigned to the resonant circuits TT[1] to TT[n], respectively, and the amplitude of current flowing in the power transmission coil $T_L$ of the resonant circuit TT[i] can be detected as the voltage value $V_D$ using the i-th detection block. In this case, a part of electronic components constituting the detection blocks (e.g. the A/D converter 144) may be shared by the first to n-th detection blocks.

Alternatively, for example, only one sense resistor 141 is disposed in the load detection circuit 140, and the sense resistor 141 is connected to the resonant circuits TT[1] to TT[n] using switches or the like so that current flowing in one of the power transmission coils $T_L$ of the resonant circuits TT[1] to TT[n] flows selectively in the one sense resistor 141. Further, using the one sense resistor 141 in a time division manner, it is possible to sequentially detect amplitudes of currents flowing in the power transmission coils $T_L$ of the resonant circuits TT[1] to TT[n] as the voltage value $V_D$.

Figure 16:
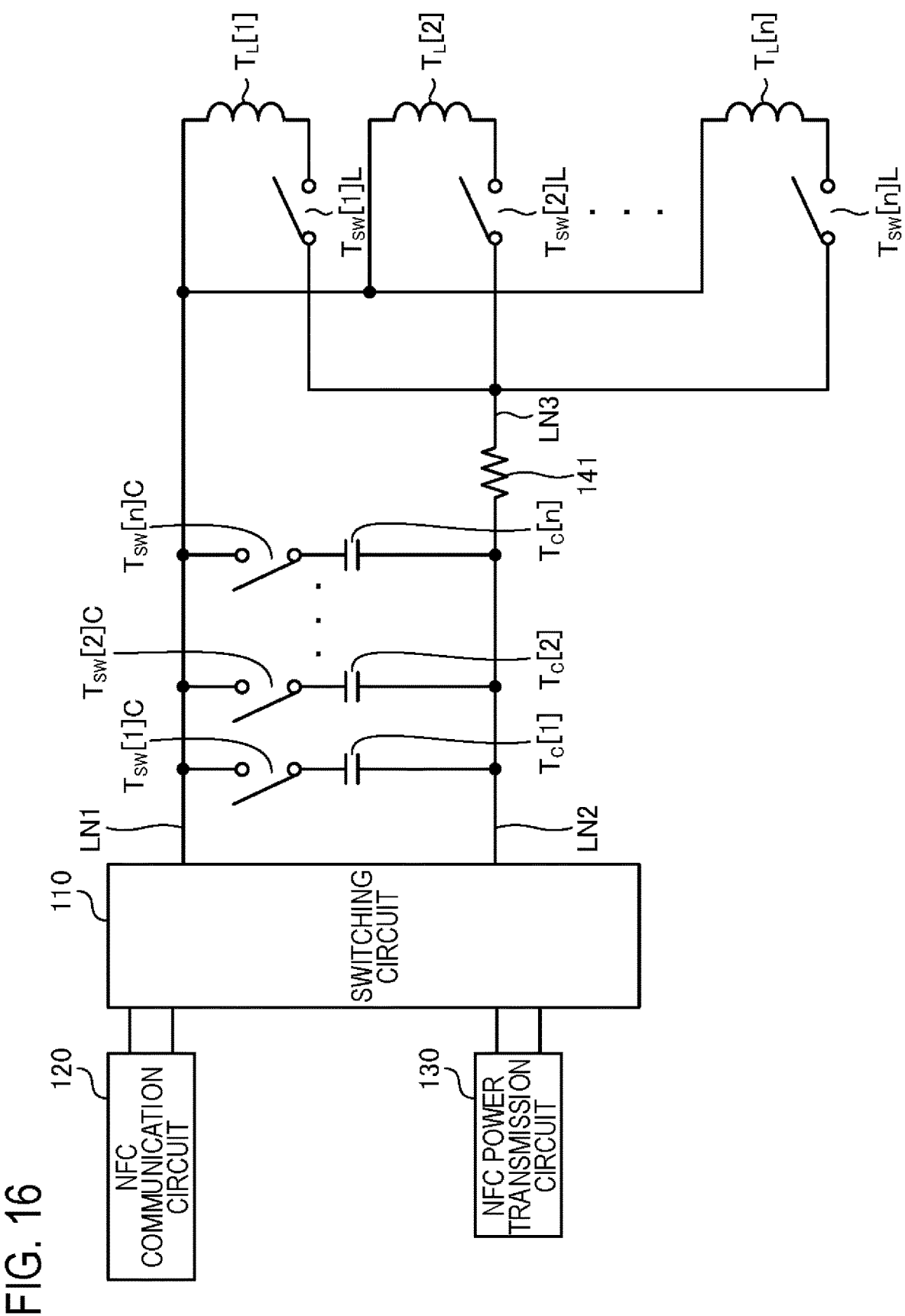
FIG. 16 shows an example of a detailed circuit diagram for realizing the first to n-th foreign object detecting connection states.

FIG. 16 shows a circuit example in the power feeding device 1, for realizing the first to n-th foreign object detecting connection states. In FIG. 16, the power transmission coil $T_L$ and the power transmission capacitor $T_C$ in the resonant circuit TT[i] are denoted by symbols $T_L[1]$ and $T_C[i]$, respectively, and switches $T_{SW}[i]L$ and $T_{SW}[i]C$ are disposed as the switches $T_{SW}$ for the resonant circuit TT[i]. The NFC communication circuit 120 or the NFC power transmission circuit 130 is connected to lines LN1 and LN2 as wirings via the switching circuit 110. The line LN1 is connected to one terminal of each of capacitors $T_C[1]$ to $T_C[n]$ via one of switches $T_{SW}[1]C$ to $T_{SW}[n]C$, and the other terminals of the capacitors $T_C[1]$ to $T_C[n]$ are connected to the line LN2. In addition, the line LN1 is commonly connected to one terminal of each of the coils $T_L[1]$ to $T_L[n]$, and the other terminals of the coils $T_L[1]$ to $T_L[n]$ are connected to a line LN3 via switches $T_{SW}[1]L$ to $T_{SW}[n]L$, respectively. The line LN3 is connected to the line LN2 via the sense resistor 141.

In the circuit example of FIG. 16, in the i-th foreign object detecting connection state, the power transmission circuit 130 is connected to the lines LN1 and LN2, and among the switches $T_{SW}[1]L$ to $T_{SW}[n]L$ and $T_{SW}[1]C$ to $T_{SW}[n]C$, only the switches $T_{SW}[i]L$ and $T_{SW}[i]C$ are turned on while the other switches are all turned off. In the power feeding connection state and in the communication connection state, among the switches $T_{SW}[1]L$ to $T_{SW}[n]L$ and $T_{SW}[1]C$ to $T_{SW}[n]C$, only the switches $T_{SW}[1]L$ and $T_{SW}[1]C$ are turned on while the other switches are all turned off. However, in the power feeding connection state, the power transmission circuit 130 is connected to the lines LN1 and LN2, while in the communication connection state, the communication circuit 120 is connected to the lines LN1 and LN2.

As to the resonant circuit TT[i], the magnetic field intensity H (see Step S12 in FIG. 15) means magnetic field intensity generated by the power transmission coil $T_L$ of the resonant circuit TT[i], and more specifically, it means the magnetic field intensity of the alternating magnetic field oscillating at the reference frequency generated by the power transmission coil $T_L$ of the resonant circuit TT[i]. As to the resonant circuit TT[i], to set the magnetic field intensity H to the test intensity means to control the power transmission circuit 130 so that a predetermined test AC signal (test alternating current) is supplied to the resonant circuit TT[i], and hence to make the power transmission coil $T_L$ of the resonant circuit TT[i] generate the alternating magnetic field having the test intensity and oscillating at the reference frequency. For example, it is preferable that "$V_{REF}[i]=V_{DO}[i]-\Delta V$" or "$V_{REF}[i]=V_{DO}[i] \times k$" should be satisfied. $\Delta V$ is a predetermined positive minute value (or $\Delta V=0$ can be satisfied). k is a coefficient having a positive predetermined value smaller than 1. Foreign object detecting reference values $V_{REF}[1]$ to $V_{REF}[n]$ obtained by repeating Steps S12 to S14 in FIG. 15 can have different values. If i and j are different integers, a parameter ($\Delta V$ or k) for determining the foreign object detecting reference value $V_{REF}[i]$ and a parameter ($\Delta V$ or k) for determining a foreign object detecting reference value $V_{REF}[j]$ may be the same or may be different from each other.

The control circuit 160 can set the magnetic field intensity H in a variable manner by controlling the amplification factor of the amplifier 132 (see FIG. 7). The test intensity is smaller than the magnetic field intensity generated by the power transmission coil $T_L$ of the resonant circuit TT[1] in the power transfer (i.e. the power transmission operation) (i.e. the magnetic field intensity of the power transmission magnetic field, which is 45~60 A/m, for example), and it is within a range from a lower limit value of 1.5 A/m to an upper limit value of 7.5 A/m of the communication magnetic field intensity.

Note that the voltage value $V_D$ that would be obtained when the magnetic field intensity H is set to the predetermined test intensity under the initial setting environment can be estimated in the design stage. On the basis of the value derived from this estimation, the foreign object detecting reference value $V_{REF}[i]$ may be determined and stored in the memory 150 without performing the initial setting process. In addition, it is possible that there are a plurality of test intensities. In this case, a plurality of foreign object detecting reference values $V_{REF}[i]$ for the plurality of test intensities can be stored in the memory 150 by repeating the process of Steps S12 to S14 described above for one resonant circuit TT[i].

[Foreign Object Detecting Process (Foreign Object Detecting Process Before Power Transfer)]

Figure 17:
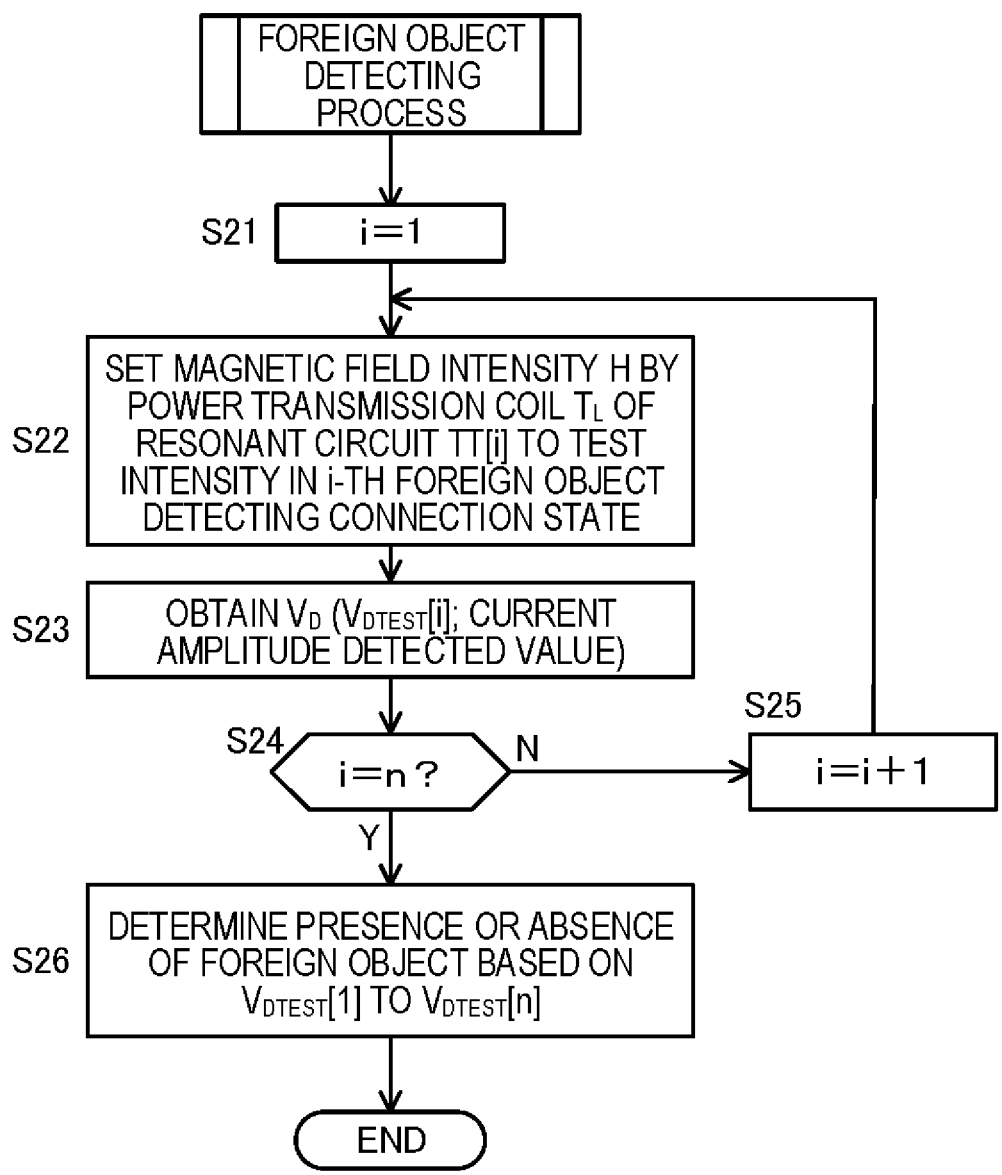
FIG. 17 is an operation flowchart of a foreign object detecting process performed by the power feeding device.

With reference to FIG. 17, the foreign object detecting process for detecting presence or absence of the foreign object 3 on the power feeding table 12 is described. FIG. 17 is a flowchart of the foreign object detecting process performed by the power feeding device 1 before the power transfer. First in Step S21, 1 is substituted into the variable i. After that, in Step S22, the control circuit 160 controls the switching circuit 110 and the switches $T_{SW}$ so as to realize the i-th foreign object detecting connection state and set the magnetic field intensity H by the power transmission coil $T_L$ of the resonant circuit TT[i] to predetermined test intensity. In next Step S23, using the load detection circuit 140, the voltage value $V_D$ when the test magnetic field is generated is obtained as a voltage value $V_{DTEST}[i]$. The voltage value $V_{DTEST}[i]$ to be also referred to as the current amplitude detected value has a value corresponding to an amplitude of current flowing in the power transmission coil $T_L$ of the resonant circuit TT[i], when the test magnetic field having the test intensity and oscillating at the reference frequency is generated in the power transmission coil $T_L$ of the resonant circuit TT[i], in the i-th foreign object detecting connection state. Note that during the period while the foreign object detecting process is performed, the $f_O$ change/short-circuit operation (the resonant frequency changing operation or the coil short-circuit operation) is performed by the electronic device 2 according to an instruction from the power feeding device 1 via the NFC communication. In addition, the magnetic field intensity of the test magnetic field (i.e. test intensity) is substantially smaller than the magnetic field intensity of the power transmission magnetic field generated by the power transmission coil $T_L$ of the resonant circuit TT[1] in the power transmission operation, and it is equal to or smaller than the upper limit value (7.5 A/m) of the communication magnetic field intensity, and hence there is no possibility or little possibility of breakage or the like of the foreign object 3 due to the test magnetic field.

In Step S24 after Step S23, the control circuit 160 determines whether or not "i=n" is satisfied. If "i=n" is satisfied, the process proceeds to Step S26. Otherwise, the variable i is incremented by 1 in Step S25 and the process returns to Step S22 so that the process of Steps S22 and S23 is repeated. Therefore, at the time point when reaching Step S26, voltage values $V_{DTEST}[1]$ to $V_{DTEST}[n]$ are obtained.

In Step S26, the control circuit 160 determines presence or absence of the foreign object 3 on the power feeding table 12 based on the voltage values $V_{DTEST}[1]$ to $V_{DTEST}[n]$ and finishes the foreign object detecting process. Determination that the foreign object 3 exists on the power feeding table 12 is referred to as foreign object presence determination. Determination that the foreign object 3 does not exist on the power feeding table 12 is referred to as foreign object absence determination. When the control circuit 160 makes the foreign object absence determination, it determines that the power transmission operation can be performed by the power transmission circuit 130 and enables execution of the power transmission operation (power transmission using the resonant circuit TT[1]). When the control circuit 160 makes the foreign object presence determination, it determines that the power transmission operation should not be performed by the power transmission circuit 130 and disables execution of the power transmission operation. When determining that the power transmission operation can be performed, in the power transmission operation, the control circuit 160 can control the power transmission circuit 130 so that a predetermined power transmission magnetic field is generated by the power transmission coil $T_L$ of the resonant circuit TT[1].

As a method for determining presence or absence of the foreign object 3 based on the voltage values $V_{DTEST}[1]$ to $V_{DTEST}[n]$ that can be adopted by the control circuit 160, there are the first to third foreign object presence/absence determination methods as described below.

In the first foreign object presence/absence determination method, the foreign object absence determination is made only in the case where determination inequality "$V_{DTEST}[i] \geq V_{REF}[i]$" is satisfied for all values of the integer i satisfying "$1 \leq i \leq n$", and otherwise the foreign object presence determination is made.

When the foreign object 3 including the antenna coil AT1 as the coil $J_L$ exists on the power feeding table 12, there is a case where the magnetic coupling degree between the coil $J_L$ and the power transmission coil $T_L$ of the resonant circuit TT[1] having the same shape as the antenna coil AT6 is weak so that the determination inequality "$V_{DTEST}[1] \geq V_{REF}[1]$" is not satisfied. However, in this case, for example, if the power transmission coil $T_L$ of the resonant circuit TT[2] has the same shape as the antenna coil AT1, $V_{DTEST}[2]$ becomes sufficiently small so that "$V_{DTEST}[2] \geq V_{REF}[2]$" is not satisfied, and hence the foreign object presence determination is made.

In the second foreign object presence/absence determination method, the foreign object absence determination is made only if the determination inequality "$V_{DTEST}[i] \geq V_{REF}$" is satisfied for all values of the integer i satisfying "$1 \leq i \leq n$", and otherwise the foreign object presence determination is made. $V_{REF}$ is one of foreign object detecting reference values $V_{REF}[1]$ to $V_{REF}[n]$ determined in the initial setting process. For example, $V_{REF}$ may be $V_{REF}[1]$ in a fixed manner (in this case, it is not necessary to determine $V_{REF}[2]$ to $V_{REF}[n]$ in the initial setting process), or may be a statistic value (e.g. a maximum value, a minimum value, an average value, or a median) of the $V_{REF}[1]$ to $V_{REF}[n]$.

The second foreign object presence/absence determination method can also provide the same effect as the case where the first foreign object presence/absence determination method is used. However, an optimal value of the foreign object detecting reference value can depend on a shape of the power transmission coil $T_L$, and hence it is preferred for improving detection accuracy of presence or absence of the foreign object 3 to adopt the first foreign object presence/absence determination method in which the foreign object detecting reference value is set and used for each power transmission coil $T_L$.

In the third foreign object presence/absence determination method, a voltage value $V_{DTEST}[MIN]$ as a minimum value of the voltage values $V_{DTEST}[1]$ to $V_{DTEST}[n]$ is compared with the foreign object detecting reference value $V_{REF}$ described above. If determination inequality "$V_{DTEST}[MIN] \geq V_{REF}$" is satisfied, the foreign object absence determination is performed, and otherwise the foreign object presence determination is performed. It is assumed that the minimum value is the voltage value $V_{DTEST}[i]$ for the power transmission coil $T_L$ having a largest magnetic coupling degree with the coil $J_L$ of the foreign object 3 among the power transmission coils $T_L$ of the resonant circuits TT[1] to TT[n], and hence it is considered that presence or absence of the foreign object 3 can be accurately determined only by evaluating the minimum value. The third foreign object presence/absence determination method can be said to be substantially the same as the second foreign object presence/absence determination method.

In this way, in the foreign object detecting process performed prior to the power transmission operation, the test AC signal is sequentially supplied from the power transmission circuit 130 to the resonant circuits TT[1] to TT[n] so that the power transmission coils $T_L$ of the resonant circuits TT[1] to TT[n] sequentially generate the test magnetic fields, and the output values $V_D$ of the load detection circuit 140 when the power transmission coils $T_L$ of the resonant circuits TT[1] to TT[n] are generating the test magnetic fields are sequentially obtained as the voltage values $V_{DTEST}[1]$ to $V_{DTEST}[n]$. Further, when using the first or second foreign object presence/absence determination method, the control circuit 160 compares each of the voltage values $V_{DTEST}[1]$ to $V_{DTEST}[n]$ (first to n-th current amplitude detected values) with a predetermined foreign object detecting reference value so as to determine presence or absence of the foreign object 3, and based on the determination, it determines whether or not the power transmission operation should be performed. On the other hand, when using the third foreign object presence/absence determination method, the control circuit 160 compares the minimum value of the voltage values $V_{DTEST}[1]$ to $V_{DTEST}[n]$ (first to n-th current amplitude detected values) with the predetermined foreign object detecting reference value so as to determine presence or absence of the foreign object 3, and based on the determination, it determines whether or not the power transmission operation should be performed.

Note that if the foreign object detecting reference value is determined and stored in the memory 150 for each of the plurality of test intensities in the initial setting process, a plurality of test magnetic fields having a plurality of test intensities may be sequentially generated for each of the resonant circuits TT[1] to TT[n] in Step S22 (see FIG. 17). Then, the foreign object absence determination or the foreign object presence determination may be made based on whether or not the determination inequality is satisfied for each test magnetic field.

With reference to FIGS. 18A to 18D, first to fourth cases are considered. In the first case, only the electronic device 2 exists on the power feeding table 12. In the second case, the electronic device 2 and the foreign object 3 exist on the power feeding table 12. In the third case, only the foreign object 3 exists on the power feeding table 12. In the fourth case, neither the electronic device 2 nor foreign object 3 exists on the power feeding table 12.

As described above, during the period while the foreign object detecting process is performed, the $f_O$ change/short-circuit operation is performed in the electronic device 2, and hence in the first case, the load for the power transmission coil $T_L$ is sufficiently small (i.e. as if the electronic device 2 does not exist on the power feeding table 12), and all the voltage values $V_{DTEST}[1]$ to $V_{DTEST}[n]$ become sufficiently large. Therefore, the foreign object absence determination is made. On the other hand, in the second case, the resonant frequency of the resonant circuit RR is changed to the above-mentioned frequency $f_M$, or the power reception coil $R_L$ is short-circuited, but the foreign object 3 continues to exist as a load of the power transmission coil $T_L$ (the resonant frequency of the resonant circuit JJ of the foreign object 3 remains to be the reference frequency). Therefore a part or a whole of the voltage values $V_{DTEST}[1]$ to $V_{DTEST}[n]$ become sufficiently small, and as a result the foreign object presence determination is made.

In the third and fourth cases, the electronic device 2 that responds to the NFC communication does not exist on the power feeding table 12, and hence the power transmission operation is not required. Therefore the foreign object detecting process itself is not performed. The power feeding device 1 can determine whether or not the electronic device 2 that can respond to the power transfer exists on the power feeding table 12, by the NFC communication. Note that the state where the foreign object 3 exists on the power feeding table 12 is not limited to the state where the foreign object 3 directly contacts with the power feeding table 12. For example, as shown in FIG. 19, the state where the electronic device 2 exists on the power feeding table 12 so as to directly contact with the same and the foreign object 3 exists on the electronic device 2 also belongs to the state where the foreign object 3 exists on the power feeding table 12, as long as the foreign object presence determination is made.

Figure 20:
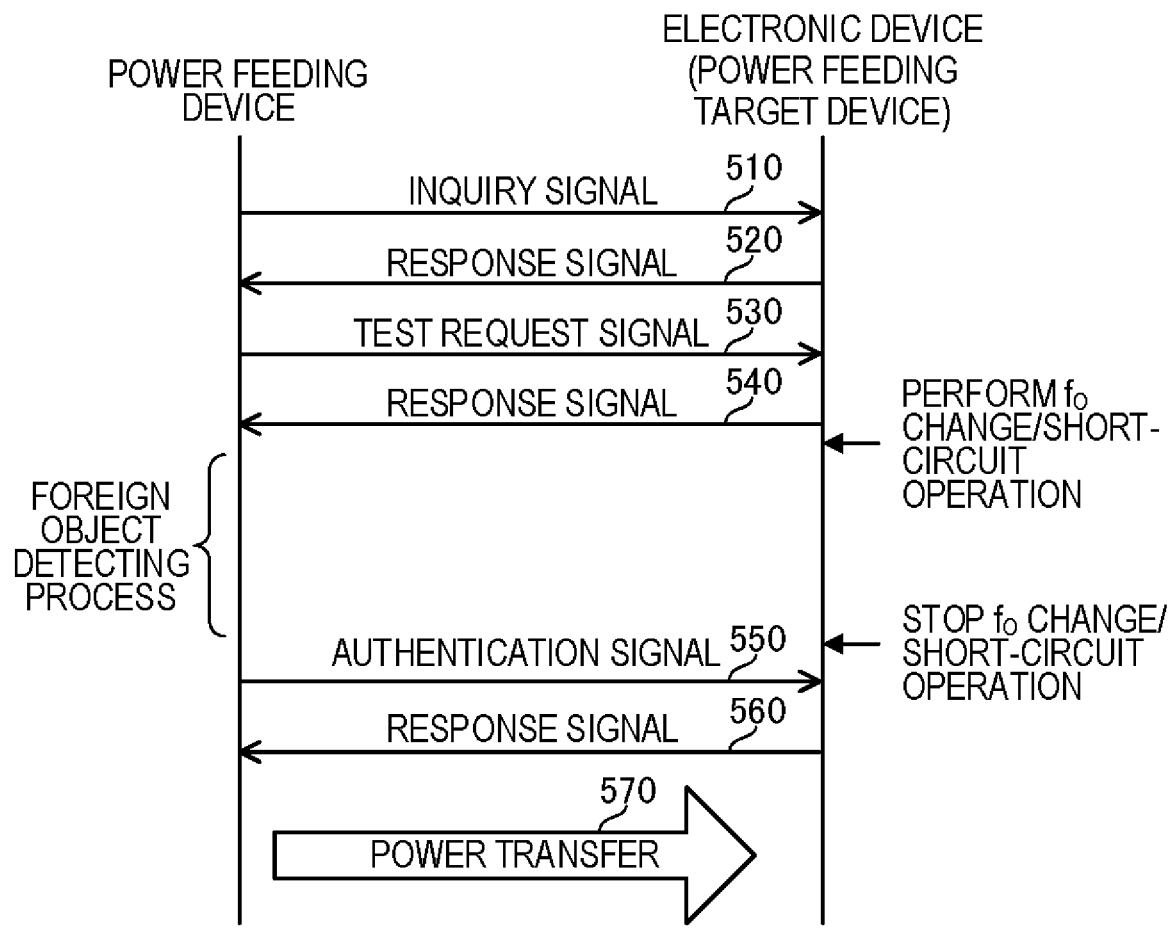
FIG. 20 is a diagram illustrating signal communication between the power feeding device and the electronic device according to the first embodiment of the present invention.

[Signal Communication Until Power Transfer: FIG. 20]

With reference to FIG. 20, signal communication between the devices 1 and 2 until the power transfer is performed is described. In the following description, it is supposed that the electronic device 2 exists on the power feeding table 12 in the reference position state (FIG. 1B) unless otherwise noted.

First, the power feeding device 1 is a transmission side while the electronic device 2 is a reception side, and the power feeding device 1 (IC 100) sends an inquiry signal 510 to the device on the power feeding table 2 (hereinafter also referred to as a power feeding target device) by the NFC communication. The power feeding target device includes the electronic device 2 and can include the foreign object 3. The inquiry signal 510 includes, for example, a signal inquiring unique identification information of the power feeding target device, a signal inquiring whether or not the power feeding target device is in a state capable of performing the NFC communication, and a signal inquiring whether the power feeding target device is ready to receive power or is asking for power transmission.

When receiving the inquiry signal 510, the electronic device 2 (IC 200) transmits a response signal 520 answering the inquiry of the inquiry signal 510 to the power feeding device 1 by the NFC communication. When receiving the response signal 520, the power feeding device 1 (IC 100) analyzes the response signal 520 and transmits a test request signal 530 to the power feeding target device by the NFC communication when the power feeding target device can perform the NFC communication and is ready to receive power or is asking for power transmission. When receiving the test request signal 530, the electronic device 2 (IC 200) as the power feeding target device transmits a response signal 540 for the test request signal 530 to the power feeding device 1 by the NFC communication, and then quickly performs the $f_O$ change/short-circuit operation (resonant frequency changing operation or coil short-circuit operation). The test request signal 530 is a signal requesting or instructing to execute the $f_O$ change/short-circuit operation, for example. When receiving the test request signal 530, the control circuit 250 of the electronic device 2 controls the resonant state changing circuit 240 to perform the $f_O$ change/short-circuit operation. Before receiving the test request signal 530, the $f_O$ change/short-circuit operation is not performed. The test request signal 530 can be any signal as long as it becomes a trigger to perform the $f_O$ change/short-circuit operation and may be included in the inquiry signal 510.

When receiving the response signal 540, the power feeding device 1 (IC 100) performs the foreign object detecting process described above. During the period of performing the foreign object detecting process, the electronic device 2 (IC 200) continues to perform the $f_O$ change/short-circuit operation. Specifically, the electronic device 2 (IC 200) uses an internal timer so as to stop the execution of the $f_O$ change/short-circuit operation after maintaining the execution of the $f_O$ change/short-circuit operation for a time period corresponding to the length of the execution period of the foreign object detecting process.

When determining that the foreign object 3 does not exist on the power feeding table 12 in the foreign object detecting process, the power feeding device 1 (IC 100) transmits an authentication signal 550 to the power feeding target device by the NFC communication. The authentication signal 550 includes a signal informing the power feeding target device that the power transmission is being performed from now on, for example. When receiving the authentication signal 550, the electronic device 2 (IC 200) transmits a response signal 560 for the authentication signal 550 to the power feeding device 1 by the NFC communication. The response signal 560 includes, for example, a signal informing that the content of the authentication signal 550 is recognized or a signal giving permission to the content of the authentication signal 550. When receiving the response signal 560, the power feeding device 1 (IC 100) connects the power transmission circuit 130 to the resonant circuit TT[1] so as to perform the power transmission operation, and thus power transfer 570 is realized.

In the first case of FIG. 18A, the power transfer 570 is performed by the flow described above. However, in the second case of FIG. 18B, the process proceeds to transmission and reception of the response signal 540, but the power transfer 570 is not performed because it is determined that a foreign object exists on the power feeding table 12 in the foreign object detecting process.

Figure 21:
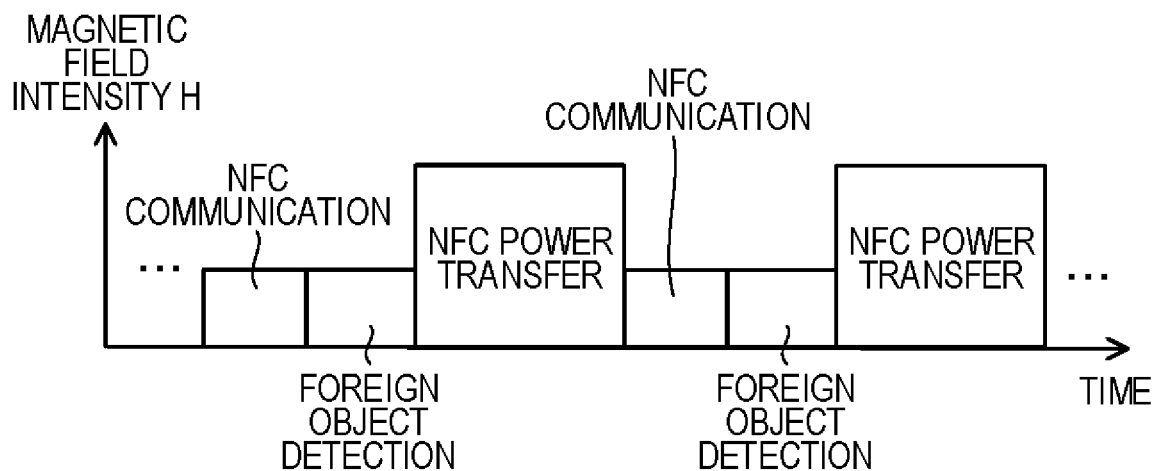
FIG. 21 is a diagram showing a manner in which the NFC communication, the foreign object detecting process, and the power transfer are repeated in sequence according to the first embodiment of the present invention.

One time of the power transfer 570 may be performed only for a predetermined period of time, and the series of processes from transmission of the inquiry signal 510 to the power transfer 570 may be repeatedly performed. In reality, as shown in FIG. 21, the NFC communication, the foreign object detecting process, and the power transfer (NFC power transfer) can be performed in order and repeatedly. In other words, in the non-contact power feeding system, the operation of performing the NFC communication, the operation of performing the foreign object detecting process, and the operation of performing the power transfer (NFC power transfer) can be performed in order and repeatedly in a time division manner.

[Operation Flowchart]

Figure 22:
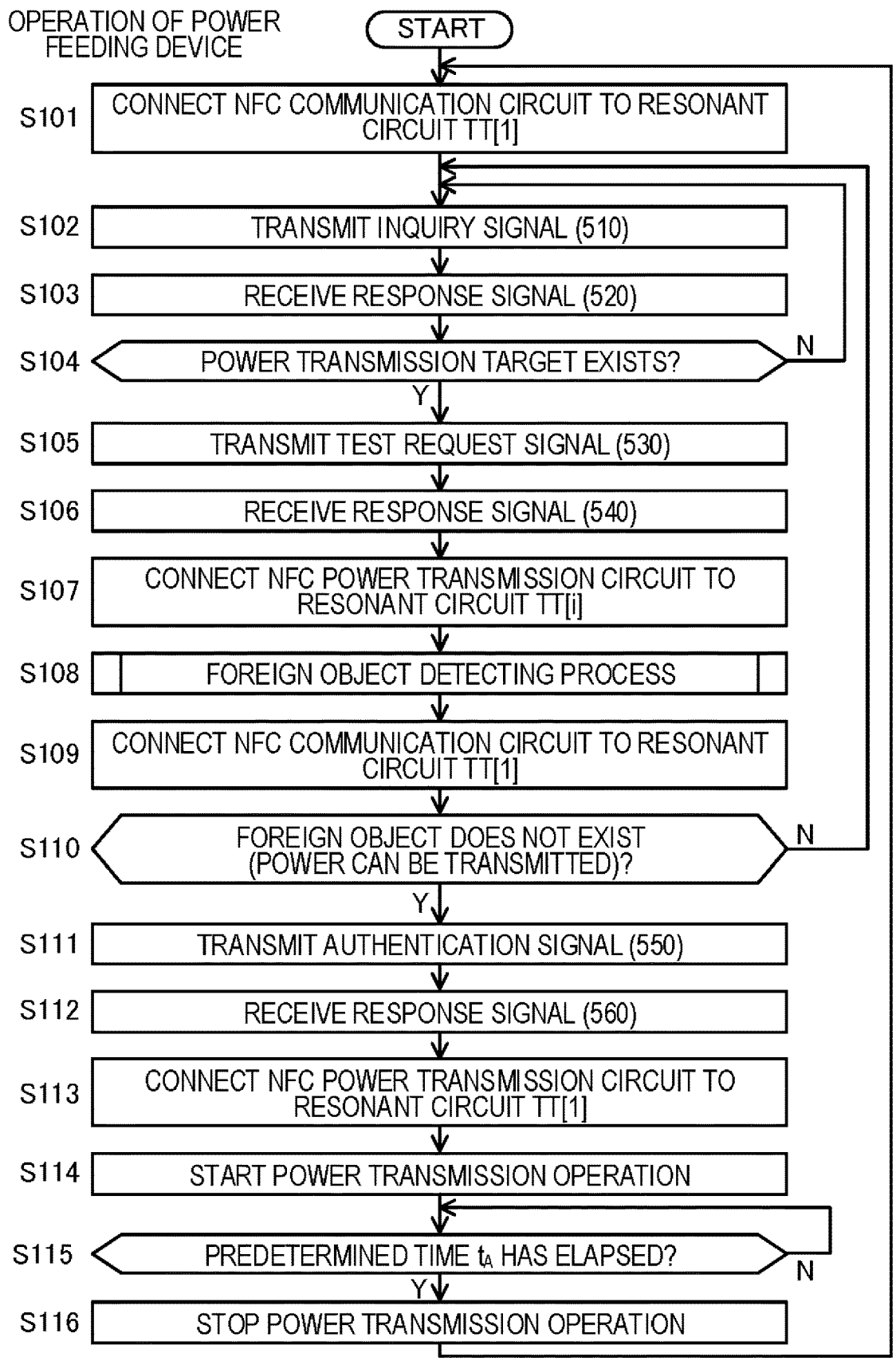
FIG. 22 is an operation flowchart of the power feeding device according to the first embodiment of the present invention.

Next, an operation flow of the power feeding device 1 is described. FIG. 22 is an operation flowchart of the power feeding device 1. The process starting from Step S101 is performed after the initial setting process. Operations of the communication circuit 120 and the power transmission circuit 130 are performed under control by the control circuit 160.

When the power feeding device 1 is activated, first in Step S101, the control circuit 160 controls the switching circuit 110 to connect the communication circuit 120 to the resonant circuit TT[1]. In next Step S102, the control circuit 160 transmits the inquiry signal 510 to the power feeding target device by the NFC communication using the communication circuit 120 and the resonant circuit TT[1]. After that, in Step S103, the control circuit 160 waits for reception of the response signal 520. When the communication circuit 120 receives the response signal 520, the control circuit 160 analyzes the response signal 520. If the power feeding target device can perform the NFC communication and is ready to receive power or is asking for power transmission, it is determined that there is a power transmission target (Y in Step S104) and the process proceeds to Step S105. Otherwise (N in Step S104), the process returns to Step S102.

In Step S105, the control circuit 160 transmits the test request signal 530 to the power feeding target device by the NFC communication using the communication circuit 120 and the resonant circuit TT[1]. After that, in Step S106, the control circuit 160 waits for reception of the response signal 540. When the communication circuit 120 receives the response signal 540, the control circuit 160 controls the switching circuit 110 to connect the power transmission circuit 130 to the resonant circuit TT[i] (e.g. the resonant circuit TT[1]) in Step S107, and performs the above-mentioned foreign object detecting process in next Step S108.

After the foreign object detecting process, in Step S109, the control circuit 160 controls the switching circuit 110 to connect the communication circuit 120 to the resonant circuit TT[1], and the process proceeds to Step S110. If the foreign object presence determination is made in the foreign object detecting process in Step S108, the process returns from Step S110 to Step S102. If the foreign object absence determination is made, the process proceeds from Step S110 to Step S111.

In Step S111, the control circuit 160 transmits the authentication signal 550 to the power feeding target device by the NFC communication using the communication circuit 120 and the resonant circuit TT[1], and then waits for reception of the response signal 560 in Step S112. When the communication circuit 120 receives the response signal 560, the control circuit 160 controls the switching circuit 110 to connect the power transmission circuit 130 to the resonant circuit TT[1] in Step S113, and the process proceeds to Step S114. The control circuit 160 starts the power transmission operation with the power transmission circuit 130 and the resonant circuit TT[1] in Step S114, and the process proceeds to Step S115.

The control circuit 160 measures an elapsed time from the start of the power transmission operation, and compares the elapsed time with a predetermined time $t_A$ in Step S115. The comparing process in Step S115 is repeated until the elapsed time reaches the time $t_A$. When the elapsed time reaches the time $t_A$ (Y in Step S115), the process proceeds to Step S116. In Step S116, the control circuit 160 controls the power transmission circuit 130 to stop the power transmission operation, and the process returns to Step S101, so that the process described above is repeated.

Figure 23:
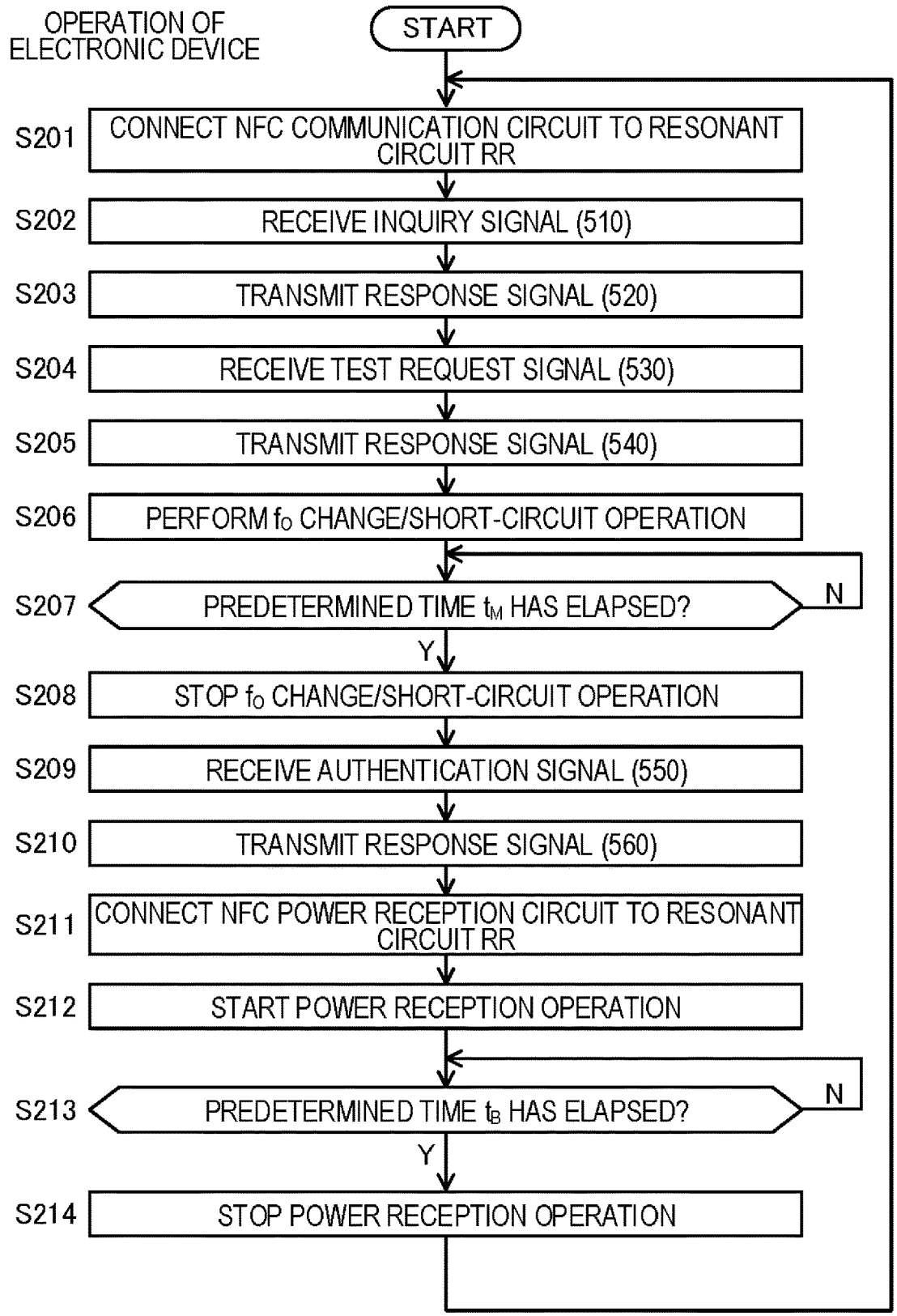
FIG. 23 is an operation flowchart of the electronic device working together with the operation of FIG. 22.

Next, a flow of the operation of the electronic device 2 is described. FIG. 23 is an operation flowchart of the electronic device 2, and the process starting from Step S201 is performed in conjunction with the operation of the power feeding device 1 after the initial setting process. Operations of the communication circuit 220 and the power reception circuit 230 are performed under control by the control circuit 250.

When the electronic device 2 is activated, first in Step S201, the control circuit 250 controls the switching circuit 210 to connect the communication circuit 220 to the resonant circuit RR. When the electronic device 2 is activated, the $f_O$ change/short-circuit operation is not performed. In next Step S202, the control circuit 250 waits for reception of the inquiry signal 510 using the communication circuit 220. When the inquiry signal 510 is received by the communication circuit 220, the control circuit 250 analyzes the inquiry signal 510 in Step S203, generates the response signal 520, and transmits the response signal 520 to the power feeding device 1 by the NFC communication using the communication circuit 220. In this case, the control circuit 250 checks a state of the battery 21. If the battery 21 is not fully charged and has no abnormality, a signal indicating being ready to receive power or asking for power transmission is included in the response signal 520. On the other hand, if the battery 21 is fully charged or has an abnormality, a signal indicating being unable to receive power is included in the response signal 520.

After that when the test request signal 530 is received by the communication circuit 220 in Step S204, the process proceeds to Step S205. In Step S205, the control circuit 250 transmits the response signal 540 to the power feeding device 1 by the NFC communication using the communication circuit 220. In next Step S206, the control circuit 250 performs the $f_O$ change/short-circuit operation using the resonant state changing circuit 240. In other words, the control circuit 250 changes the resonant frequency $f_O$ from the reference frequency to the frequency $f_M$ or short-circuits the power reception coil $R_L$. The control circuit 250 measures an elapsed time from the start of the operation of the $f_O$ change/short-circuit operation (Step S207). When the elapsed time reaches a predetermined time $t_M$, the $f_O$ change/short-circuit operation is stopped (Step S208). In other words, the resonant frequency $f_O$ is returned to the reference frequency, or the short-circuit of the power reception coil $R_L$ is canceled. After that, the process proceeds to Step S209. The time $t_M$ is set in advance so that execution of the $f_O$ change/short-circuit operation is maintained during the period while the power feeding device 1 is performing the foreign object detecting process (i.e. while the test magnetic field is generated) and that the $f_O$ change/short-circuit operation is stopped promptly when the period elapses. It is possible to designate the time $t_M$ in the test request signal 530.

In Step S209, the control circuit 250 waits for reception of the authentication signal 550 using the communication circuit 220. When the communication circuit 220 receives the authentication signal 550, the control circuit 250 transmits the response signal 560 for the authentication signal 550 to the power feeding device 1 by the NFC communication using the communication circuit 220 in Step S210. Note that if the foreign object 3 exists on the power feeding table 12, the authentication signal 550 is not transmitted from the power feeding device 1 (see Step S110 in FIG. 22). Therefore if the authentication signal 550 is not received for a certain period in Step S209, the process should return to Step S201.

After the response signal 560 is transmitted, in Step S211, the control circuit 250 controls the switching circuit 210 to connect the power reception circuit 230 to the resonant circuit RR, and in next Step S212, it starts the power reception operation using the power reception circuit 230. The control circuit 250 measures an elapsed time from the start of the power reception operation and compares the elapsed time with a predetermined time $t_B$ (Step S213). Further, when the elapsed time reaches the time $t_B$ (Y in Step S213), the control circuit 250 stops the power reception operation in Step S214, and the process returns to Step S201.

The time $t_B$ is determined in advance or is designated in the authentication signal 550 so that the period of performing the power reception operation is substantially the same as the period while the power feeding device 1 performs the power transmission operation. After the power reception operation is started, the control circuit 250 may monitor charging current for the battery 21, and when a charging current value becomes a predetermined value or less, it may determine that the power transmission operation is finished so as to stop the power reception operation, and the process may proceed to Step S201.

According to this embodiment, when the foreign object 3 is misplaced on the power feeding table 12, the power transmission operation is not performed through the foreign object detecting process, and hence breakage or the like of the foreign object 3 due to the power transmission operation can be avoided. Further, because a plurality of power transmission coils having different shapes (including sizes as described above) are used for the foreign object detecting process, presence or absence of the foreign object 3 that can have various shapes of coils $J_L$ (antenna coils) can be detected with high accuracy.

Second Embodiment

A second embodiment of the present invention is described. The second embodiment is based on the first embodiment, and the description of the first embodiment is also applied to the second embodiment as long as no contradiction occurs, unless otherwise noted in the description of the second embodiment.

Figure 24:
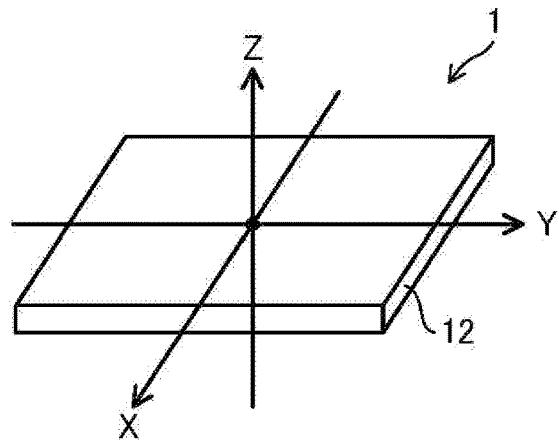
FIG. 24 is a diagram showing a relationship among X-axis, Y-axis, Z-axis, and the power feeding table according to a second embodiment of the present invention.

In the second embodiment, there described a specific example of the power transmission coils $T_L$ in the resonant circuits TT[1] and TT[2] when n is 2. The power transmission coil $T_L$ of the resonant circuit TT[1] and the power transmission coil $T_L$ of the resonant circuit TT[2] are denoted by symbols $T_L[1]$ and $T_L[2]$, respectively. Prior to the description of this specific example, X-axis, Y-axis, and Z-axis, which are orthogonal to each other, are defined as shown in FIG. 24. The X-axis and the Y-axis are parallel to a placement surface of the power feeding table 12, and therefore the Z-axis is perpendicular to the placement surface of the power feeding table 12. The placement surface of the power feeding table 12 is a surface on which the electronic device 2 is to be placed, and the electronic device 2 and the foreign object 3 can be placed on the placement surface.

Figure 25A:
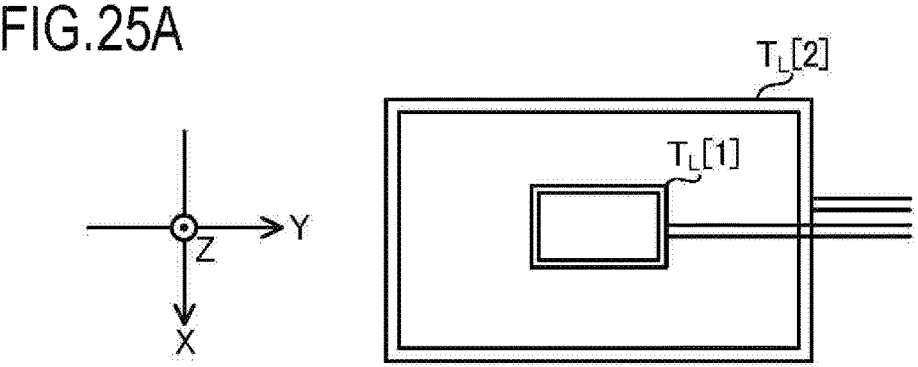
FIGS. 25A to 25C are respectively a plan view, a perspective view, and a cross-sectional view in a schematic manner of two power transmission coils according to the second embodiment of the present invention.
Figure 25B:
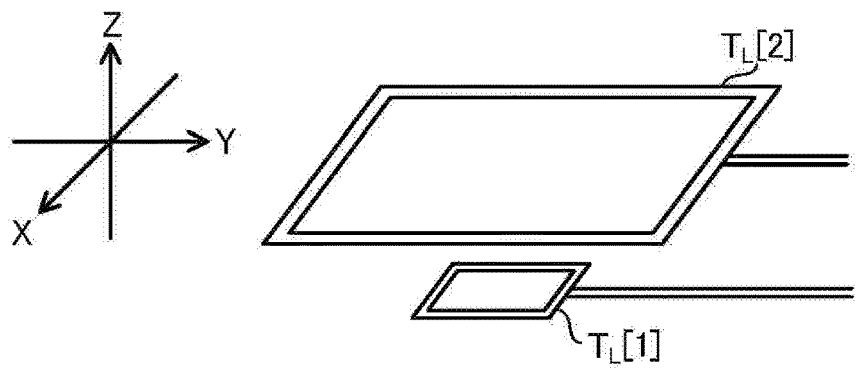
Figure 25C:
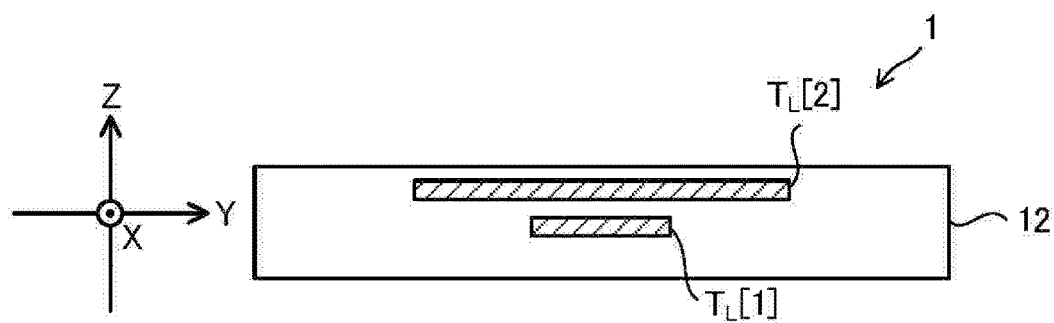

FIG. 25A is a schematic plan view of the power transmission coils $T_L[1]$ and $T_L[2]$, and FIG. 25B is a schematic perspective view of the power transmission coils $T_L[1]$ and $T_L[2]$. FIG. 25C is a schematic cross-sectional view of the power transmission coils $T_L[1]$ and $T_L[2]$ taken along a plane parallel to the Y-axis and the Z-axis. In FIGS. 25A and 25B, each wiring of power transmission coils $T_L[i]$ is shown by a double square frame for simple illustration and for preventing complication. In the diagrams including the coil, lines extending laterally from the double square frame representing the coil represent leads of the coils.

Each of the power transmission coils $T_L[1]$ and $T_L[2]$ forms a loop antenna, and loop surfaces of the loop antennas (i.e. planes on which the wirings of the power transmission coils $T_L[1]$ and $T_L[2]$ are positioned) are parallel to the X-axis and the Y-axis.

A size of the power transmission coil $T_L[1]$ is smaller than a size of the power transmission coil $T_L[2]$. For example, the power transmission coil $T_L[1]$ is the same as the antenna coil AT6, while the power transmission coil $T_L[2]$ is the same as the antenna coil AT1 (see FIGS. 12F and 12A). In this case, for example, the power transmission coil $T_L[1]$ is used for the NFC communication and power transfer (NFC power transfer) and for detecting presence or absence of the foreign object 3 having the coil $J_L$ that is a relatively small antenna coil such as the antenna coil AT4, AT5, or AT6. On the other hand, the power transmission coil $T_L[2]$ is used for detecting presence or absence of the foreign object 3 having the coil $J_L$ that is a relatively large antenna coil such as the antenna coil AT1, AT2, or AT3.

For example, the center axis of the loop antenna of the power transmission coil $T_L[1]$ is identical to the center axis of the loop antenna of the power transmission coil $T_L[2]$, and the wiring of the power transmission coil $T_L[1]$ is positioned inside the wiring of the power transmission coil $T_L[2]$ viewed from the Z-axis direction. However, as shown in FIG. 25C, the surface on which the wiring of the power transmission coil $T_L[2]$ is positioned and the surface on which the wiring of the power transmission coil $T_L[1]$ is positioned are parallel to each other but are separated by a predetermined distance in the Z-axis direction. Although different from FIGS. 25B and 25C, the wiring of the power transmission coil $T_L[2]$ and the wiring of the power transmission coil $T_L[1]$ may be positioned on the same plane.

It is assumed that a shape of the power reception coil $R_L$ of the electronic device 2 is also the same as a shape of the antenna coil AT6. When the electronic device 2 is placed on the placement surface of the power feeding table 12 (i.e. in the reference position state), the loop surface of the loop antenna as the power reception coil $R_L$ (i.e. the surface on which the wiring of the power reception coil $R_L$ is positioned) is parallel to the X-axis and the Y-axis. In this way, the magnetic coupling degree between the power transmission coil $T_L[i]$ and the power reception coil $R_L$ is increased. In addition, when the foreign object 3 such as a non-contact IC card is placed on the placement surface of the power feeding table 12, the loop surface of the loop antenna as the coil $J_L$ of the foreign object 3 (i.e. the surface on which the wiring of the coil $J_L$ is positioned) is also parallel to the X-axis and the Y-axis.

Figure 26:
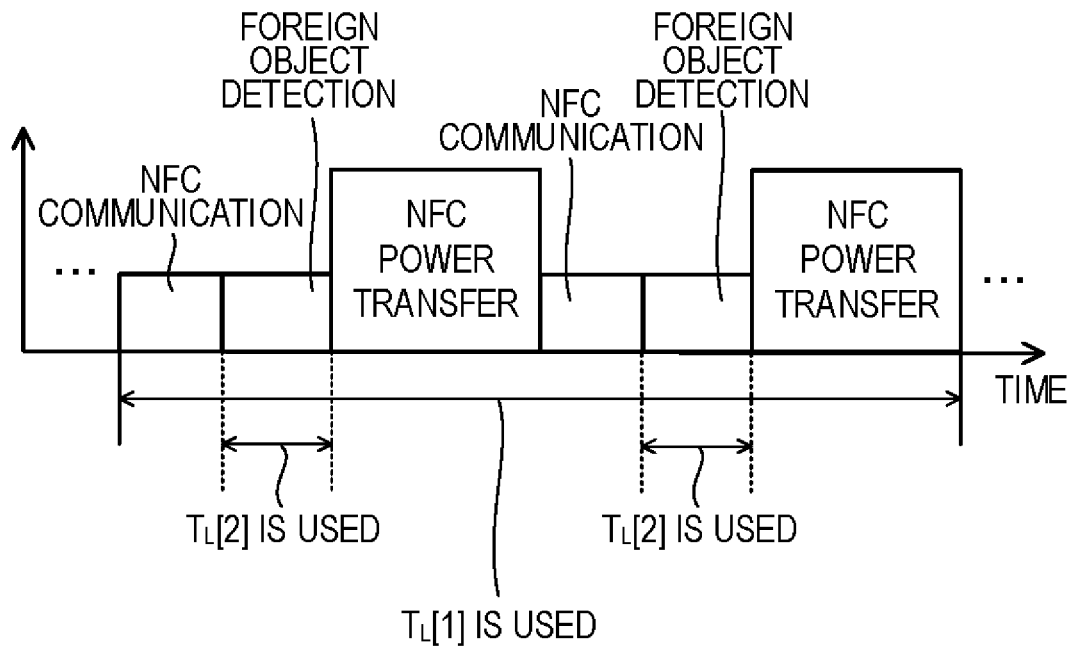
FIG. 26 is a diagram showing an example of division of roles among a plurality of power transmission coils.
Figure 27:
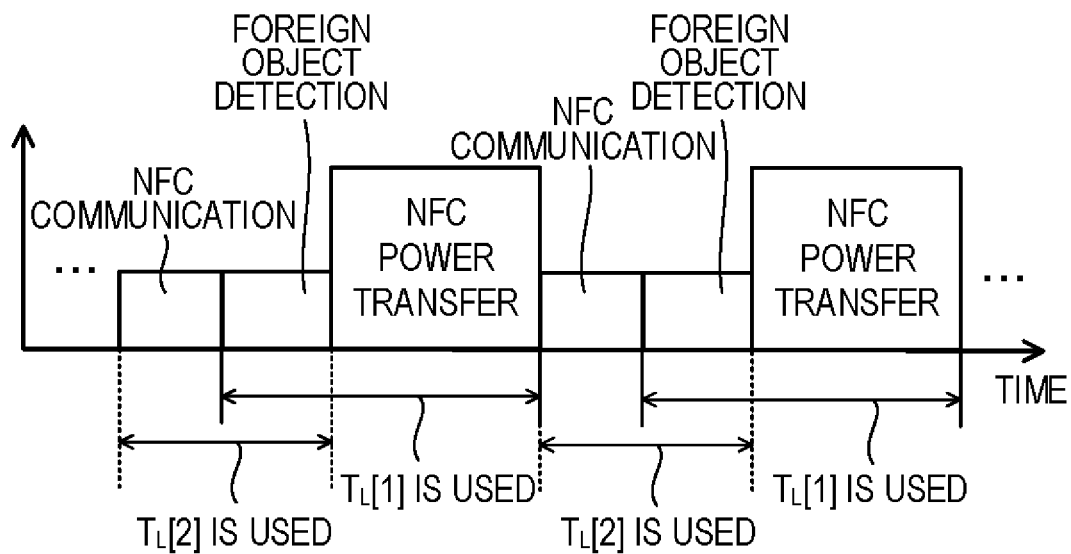
FIG. 27 is a diagram showing another example of division of roles among a plurality of power transmission coils.

In the method described above, as shown in FIG. 26, the power transmission coil $T_L[1]$ is used for the NFC communication, the power transfer (NFC power transfer), and the foreign object detecting process, while the power transmission coil $T_L[2]$ is not used for the NFC communication and power transfer (NFC power transfer) but is used only for the foreign object detecting process. However, the division of roles between the power transmission coils $T_L[1]$ and $T_L[2]$ is not limited to this. In other words, for example, the foreign object detecting process is performed using both the power transmission coils $T_L[1]$ and $T_L[2]$, but the NFC communication may be performed using arbitrary one of the power transmission coils $T_L[1]$ and $T_L[2]$, and the power transfer (NFC power transfer) may also be performed using arbitrary one of the power transmission coils $T_L[1]$ and $T_L[2]$. As an example, FIG. 27 shows a case where the power transmission coil $T_L[1]$ is used for performing the power transfer (NFC power transfer), while the power transmission coil $T_L[2]$ is used for performing the NFC communication. The foreign object detecting process is performed by using both the power transmission coils $T_L[1]$ and $T_L[2]$.

Including a case where the number n of the power transmission coils is not 2, the following generalization can be made. Although the foreign object detecting process is performed using the power transmission coils $T_L[1]$ to $T_L[n]$, the NFC communication may be performed using arbitrary one of the power transmission coils $T_L[1]$ to $T_L[n]$, and the power transfer (NFC power transfer) may also be performed using arbitrary one of the power transmission coils $T_L[1]$ to $T_L[n]$. The power transmission coil that is used for the NFC communication and the power transmission coil that is used for the power transfer (NFC power transfer) may be the same or different from each other.

Consideration About Present Invention

The present invention implemented by the embodiments described above is considered.

A power transmitting device $W_1$ according to an aspect of the present invention, which is a power transmitting device (1) capable of transmitting power to a power receiving device (2) by a magnetic field resonance scheme, includes first to n-th resonant circuits (TT[1] to TT[n]) (n is an integer equal to or larger than 2) having different sizes of coils and resonant frequencies set to a prescribed reference frequency, a power transmission circuit (130) arranged to selectively supply an AC signal to one of the first to n-th resonant circuits, a detection circuit (140) arranged to detect amplitude of current flowing in the coil of the resonant circuit supplied with the AC signal, and a control circuit (160) arranged to control the power transmission circuit. Prior to the power transmission, the control circuit controls to sequentially supply the AC signal to the first to n-th resonant circuits so as to obtain first to n-th amplitude detected values ($V_{DTEST}[1]$ to $V_{DTEST}[n]$) corresponding to the first to n-th resonant circuits from the detection circuit, and performs execution control of the power transmission based on the first to n-th amplitude detected values.

The power receiving device can receive power transmitted from the coil of the power transmitting device using the magnetic field resonance. On the other hand, there can be a foreign object that is a device different from the power receiving device and has a coil responding to a magnetic field generated by the coil of the power transmitting device. In a state where the foreign object exists in a place responding to the magnetic field generated by the coil of the power transmitting device, when a power transmission magnetic field is generated by the coil of the power transmitting device, breakage or the like of the foreign object may occur. In order to avoid this, it is important to perform the execution control of the power transmission after determining presence or absence of the foreign object.

When the foreign object exists in the place responding to the magnetic field generated by the coil of the power transmitting device, there are characteristics that the amplitude of current flowing in the coil is decreased. Using the characteristics, it is possible to detect presence or absence of the foreign object based on a variation of the amplitude of current. However, it is considered that there are various shapes (including sizes) of the coil (antenna coil) of the foreign object, and there are various variations of the current amplitude due to existence of the foreign object depending on its shape.

Considering this, the power transmitting device is provided with the first to n-th resonant circuits having different sizes of coils, and the first to n-th amplitude detected values corresponding to the first to n-th resonant circuits are used. In this way, presence or absence of the foreign object that can have various shapes of coils (antenna coils) can be detected with high accuracy, and it is possible to perform an appropriate power transmission control based on a result of the detection. Typically, for example, it is possible to control to disable execution of the power transmission when determining that the foreign object exists, so that breakage or the like of the foreign object can be avoided.

Specifically, for example, it is preferred that the control circuit should determine presence or absence of a foreign object that is different from the power receiving device and includes a resonant circuit having a resonant frequency set to the reference frequency, based on the first to n-th amplitude detected values, and should enable execution of the power transmission when determining that the foreign object does not exist, while it should disable the execution of the power transmission when determining that the foreign object exists.

Furthermore, for example, the control circuit may determine whether to enable or disable the execution of the power transmission by comparing each of the first to n-th amplitude detected values with a predetermined reference value.

Alternatively, for example, the control circuit may determine whether to enable or disable the execution of the power transmission by comparing a minimum value of the first to n-th amplitude detected values with a predetermined reference value.

Furthermore, for example, it is preferred that the power transmission should be performed using the power transmission circuit and the first resonant circuit, and intensities of magnetic fields (test magnetic fields) generated by the coils of the resonant circuits when the AC signal is supplied to the resonant circuits prior to the power transmission should be smaller than intensity of a magnetic field (power transmission magnetic field) generated by the coil of the first resonant circuit when the power transmission is performed.

In this way, it is possible to prevent breakage or the like of the foreign object due to the magnetic field generated prior to the power transmission.

Furthermore, for example, it is preferred that the power receiving device should include a power reception resonant circuit (RR) having a resonant frequency set to the reference frequency so as to be capable of receiving power with the power reception resonant circuit, and when the first to n-th amplitude detected values are obtained, the resonant frequency of the power reception resonant circuit should be changed from the reference frequency, or the coil of the power reception resonant circuit should be short-circuited in the power receiving device, according to a signal of communication from the power transmitting device.

In this way, influence of the power reception resonant circuit to the amplitude detected value by the detection circuit of the power transmitting device is suppressed so that presence or absence of the foreign object can be accurately determined, and hence appropriate power transmission control can be performed.

In a non-contact power feeding system $W_2$ capable of transmitting power from a power transmitting device to a power receiving device by a magnetic field resonance scheme, the power transmitting device includes first to n-th resonant circuits (n is an integer equal to or larger than 2) having different sizes of coils and resonant frequencies set to a prescribed reference frequency, a power transmission circuit arranged to selectively supply an AC signal to one of the first to n-th resonant circuits, a detection circuit arranged to detect amplitude of current flowing in the coil of the resonant circuit supplied with the AC signal, and a control circuit arranged to control the power transmission circuit. The power receiving device includes a power reception resonant circuit including a power reception coil, and a changing/short-circuiting circuit arranged to change a resonant frequency of the power reception resonant circuit from the reference frequency as a resonant frequency for the power reception, or to short-circuit the power reception coil, prior to power reception from the power transmitting device. The control circuit sequentially supply the AC signal to the first to n-th resonant circuits so as to obtain first to n-th amplitude detected values corresponding to the first to n-th resonant circuits from the detection circuit, prior to the power transmission, in the state where the resonant frequency of the power reception resonant circuit is changed or the power reception coil is short-circuited in the power receiving device, based on a signal of the communication from the power transmitting device, and performs execution control of the power transmission based on the first to n-th amplitude detected values.

The non-contact power feeding system $W_2$ can also obtain the same action and effect as the power transmitting device $W_1$ described above.

Note that the power feeding device 1 itself in each of the embodiments described above may function as the power transmitting device according to the present invention, or a part of the power feeding device 1 in each of the embodiment described above may function as the power transmitting device according to the present invention. In the same manner, the electronic device 2 itself in each of the embodiments described above may function as the power receiving device according to the present invention, or a part of the electronic device 2 in each of the embodiments described above may function as the power receiving device according to the present invention.

Variations

The embodiments of the present invention can be appropriately and variously modified within the scope of the technical concept defined in the claims. The embodiments described above are merely examples of the embodiment of the present invention, and the present invention and meanings of terms of the structural elements are not limited to those described in the above embodiments. Specific numeric values shown in the above description are merely examples, and they can be variously changed as a matter of course. As notes applicable to the embodiments described above, Notes 1 to 3 are described below. The contents of the Notes can be arbitrarily combined as long as no contradiction occurs.

[Note 1]

In the embodiments described above, the frequencies of various signals and the resonant frequency are set to 13.56 MHz as the reference frequency, but 13.56 MHz is a target value of setting, and actual frequencies in the real device have errors.

[Note 2]

In the embodiments, the present invention is embodied according to the NFC standard, and therefore the reference frequency is 13.56 MHz, but the reference frequency may be different from 13.56 MHz. In relation to this, the communication and power transfer between the power feeding device and the electronic device, to which the present invention is applied, may be communication and power transfer according to a standard other than the NFC.

[Note 3]

The target device as the power receiving device or the power transmitting device according to the present invention can be constituted of hardware such as an integrated circuit or a combination of hardware and software. An arbitrary particular function as a whole or a part of the functions realized by the target device may be described as a program, and the program may be stored in a flash memory that can be mounted in the target device. Then, the program may be executed by a program executing device (such as a microcomputer that can be mounted in the target device) so that the particular function is realized. The program can be stored and fixed in an arbitrary recording medium. The recording medium in which the program is stored and fixed may be mounted in or connected to a device different from the target device (such as a server device).

LIST OF REFERENCE SIGNS 1 power feeding device
2 electronic device
130 NFC power transmission circuit
140 load detection circuit
160 control circuit
230 NFC power reception circuit
240 resonant state changing circuit
250 control circuit
TT, TT[1] to TT[n] power transmission resonant circuit
$T_L$ power transmission coil
$T_C$ power transmission capacitor
RR power reception resonant circuit
$R_L$ power reception coil
$R_C$ power reception capacitor

The invention claimed is:

1. A power transmitting device capable of transmitting power to a power receiving device by a magnetic field resonance scheme, comprising:
   first to n-th resonant circuits having different sizes of coils and resonant frequencies set to a prescribed reference frequency;
   a power transmission circuit arranged to selectively supply an AC signal to one of the first to n-th resonant circuits;
   a detection circuit arranged to detect amplitude of current flowing in the coil of the resonant circuit supplied with the AC signal; and
   a control circuit arranged to control the power transmission circuit, wherein n is an integer equal to or greater than 2,
   the control circuit sequentially supplies the AC signal to the first to n-th resonant circuits so as to obtain first to n-th amplitude detected values corresponding to the first to n-th resonant circuits from the detection circuit prior to the power transmission, and performs execution control of the power transmission based on the first to n-th amplitude detected values,
   in each of the first to n-th resonant circuits, a switch is provided in series with the coil,
   the first to n-th amplitude detected values are obtained in first to n-th connection states, respectively,
   in an i-th connection state, the power transmission circuit is connected only to an i-th resonant circuit out of the first to n-th resonant circuits and only the switch in the i-th resonant circuit out of the first to n-th resonant circuits is turned on, and
   i is an integer equal to or greater than 1, but equal to or less than n,
   wherein the control circuit determines presence or absence of a foreign object that is different from the power receiving device and includes another resonant circuit having a resonant frequency set to the reference frequency, based on the first to n-th amplitude detected values, and enables execution of the power transmission when determining that the foreign object does not exist, while it disables the execution of the power transmission when determining that the foreign object exists, and
   wherein the other resonant circuit is different from any of the first to n-th resonant circuits.

2. The power transmitting device according to claim 1, wherein the control circuit determines whether to enable or disable execution of the power transmission by comparing each of the first to n-th amplitude detected values with a predetermined reference value.

3. The power transmitting device according to claim 1, wherein the control circuit determines whether to enable or disable execution of the power transmission by comparing a minimum value of the first to n-th amplitude detected values with a predetermined reference value.

4. The power transmitting device according to claim 1, wherein
   the power transmission is performed using the power transmission circuit and the first resonant circuit, and
   magnetic field intensities of magnetic fields generated by the coils of the resonant circuits when the AC signal is supplied to the resonant circuits prior to the power transmission is smaller than magnetic field intensity of a magnetic field generated by the coil of the first resonant circuit when the power transmission is performed.

5. The power transmitting device according to claim 1, wherein
   the power receiving device includes a power reception resonant circuit having a resonant frequency set to the reference frequency so as to be capable of receiving power with the power reception resonant circuit, and when the first to n-th amplitude detected values are obtained, the resonant frequency of the power reception resonant circuit is changed from the reference frequency, or a coil of the power reception resonant circuit is short-circuited in the power receiving device, according to a signal of communication from the power transmitting device.

6. The non-contact power feeding system according to claim 1, wherein
the power transmission is performed using the power transmission circuit and the first resonant circuit, and
magnetic field intensities of magnetic fields generated by the coils of the resonant circuits when the AC signal is supplied to the resonant circuits prior to the power transmission is smaller than magnetic field intensity of a magnetic field generated by the coil of the first resonant circuit when the power transmission is performed.

7. The power transmitting device according to claim 1, wherein
the first to n-th resonant circuits respectively have first to n-th coils, first to n-th capacitors, and first to n-th switches,
an i-th coil, an i-th capacitor, and an i-th switch are provided in the i-th resonant circuit, and
in the i-th resonant circuit, the i-th switch has two switches, a first one of which is provided between one terminal of the i-th coil and one terminal of the i-th capacitor, and a second one of which is provided between another terminal of the i-th coil and another terminal of the i-th capacitor.

8. A non-contact power feeding system capable of transmitting power from a power transmitting device to a power receiving device by a magnetic field resonance scheme, wherein
the power transmitting device includes first to n-th resonant circuits having different sizes of coils and resonant frequencies set to a prescribed reference frequency, a power transmission circuit arranged to selectively supply an AC signal to one of the first to n-th resonant circuits, a detection circuit arranged to detect amplitude of current flowing in the coil of the resonant circuit supplied with the AC signal, and a control circuit arranged to control the power transmission circuit, where n is an integer equal to or greater than 2,
the power receiving device includes a power reception resonant circuit including a power reception coil, and a resonant state changing circuit arranged to change a resonant frequency of the power reception resonant circuit from the reference frequency as a resonant frequency for the power reception, or to short-circuit the power reception coil, prior to power reception from the power transmitting device, and
the control circuit sequentially supply the AC signal to the first to n-th resonant circuits so as to obtain first to n-th amplitude detected values corresponding to the first to n-th resonant circuits from the detection circuit, prior to the power transmission, in the state where the resonant frequency of the power reception resonant circuit is changed or the power reception coil is short-circuited in the power receiving device, based on a signal of the communication from the power transmitting device, and performs execution control of the power transmission based on the first to n-th amplitude detected values,
in each of the first to n-th resonant circuits, a switch is provided in series with the coil,
the first to n-th amplitude detected values are obtained in first to n-th connection states, respectively,
in an i-th connection state, the power transmission circuit is connected only to an i-th resonant circuit out of the first to n-th resonant circuits and only the switch in the i-th resonant circuit out of the first to n-th resonant circuits is turned on, and
i is an integer equal to or greater than 1, but equal to or less than n;
wherein the control circuit determines presence or absence of a foreign object that is different from the power receiving device and includes another resonant circuit having a resonant frequency set to the reference frequency, based on the first to n-th amplitude detected values, and enables execution of the power transmission when determining that the foreign object does not exist, while it disables the execution of the power transmission when determining that the foreign object exists, and
wherein the other resonant circuit is different from any of the first to n-th resonant circuits.

9. The non-contact power feeding system according to claim 8, wherein the control circuit determines whether to enable or disable execution of the power transmission by comparing each of the first to n-th amplitude detected values with a predetermined reference value.

10. The non-contact power feeding system according to claim 8, wherein the control circuit determines whether to enable or disable execution of the power transmission by comparing a minimum value of the first to n-th amplitude detected values with a predetermined reference value.

11. The non-contact power feeding system according to claim 8, wherein
the first to n-th resonant circuits respectively have first to n-th coils, first to n-th capacitors, and first to n-th switches,
an i-th coil, an i-th capacitor, and an i-th switch are provided in the i-th resonant circuit, and
in the i-th resonant circuit, the i-th switch has two switches, a first one of which is provided between one terminal of the i-th coil and one terminal of the i-th capacitor, and a second one of which is provided between another terminal of the i-th coil and another terminal of the i-th capacitor.

* * * * *